(12) United States Patent
Buske et al.

(10) Patent No.: US 6,757,136 B2
(45) Date of Patent: Jun. 29, 2004

(54) APPARATUS AND METHOD FOR COUPLING A FLEX SUSPENSION ASSEMBLY TO AN ACTUATOR ASSEMBLY

(75) Inventors: Lon R. Buske, Apple Valley, MN (US); Rodney D. Dahlenburg, Minneapolis, MN (US); Aldeen R. Goehring, Shakopee, MN (US); Niandong Liu, Apple Valley, MN (US); Kevin Lambert Mayer, Apple Valley, MN (US); William J. Raphael, Mustang, OK (US); Daniel Richard Smith, Minnetonka, MN (US); Mark A. Toffle, St. Louis Park, MN (US); Brent M. Weichelt, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 233 days.

(21) Appl. No.: 10/004,355

(22) Filed: Oct. 31, 2001

(65) Prior Publication Data

US 2002/0181161 A1 Dec. 5, 2002

Related U.S. Application Data

(60) Provisional application No. 60/295,275, filed on Jun. 1, 2001, and provisional application No. 60/311,727, filed on Aug. 10, 2001.

(51) Int. Cl.[7] .......................... G11B 5/48; G11B 21/16; B23P 19/00; H04R 31/00
(52) U.S. Cl. ................ 360/244.5; 360/265.9; 29/737; 29/603.03
(58) Field of Search .................. 360/265.7, 265.9, 360/244.6, 244.5, 266.3; 29/729, 737, 428, 505, 522.1, 757, 603.03

(56) References Cited

U.S. PATENT DOCUMENTS

| | | | |
|---|---|---|---|
| 4,829,395 A | 5/1989 | Coon et al. ................. 360/104 |
| 4,912,583 A | 3/1990 | Hinlein ........................ 360/104 |
| 4,943,875 A | * 7/1990 | Reidenbach et al. ...... 360/245.2 |
| 4,991,045 A | 2/1991 | Oberg ......................... 360/104 |
| 5,095,369 A | 3/1992 | Ortiz et al. .................. 358/296 |
| 5,185,683 A | 2/1993 | Oberg et al. ................ 360/104 |
| 5,268,805 A | 12/1993 | Peng et al. .................. 360/106 |
| 5,717,545 A | 2/1998 | Brooks, Jr. et al. ......... 360/104 |
| 5,946,164 A | * 8/1999 | Tracy ....................... 360/244.5 |
| 6,038,103 A | 3/2000 | Boutaghou et al. ......... 360/104 |
| 6,061,896 A | * 5/2000 | Tracy ....................... 29/603.03 |
| 6,078,469 A | 6/2000 | Girard ......................... 360/104 |
| 6,141,868 A | * 11/2000 | Schmidt et al. ............... 29/757 |
| 6,166,886 A | 12/2000 | Toensing ................. 360/244.5 |
| 6,198,602 B1 | 3/2001 | Vera et al. ............... 360/244.5 |
| 6,353,994 B1 | * 3/2002 | Boutaghou et al. ...... 29/603.03 |
| 6,407,888 B1 | * 6/2002 | Crane ....................... 360/244.5 |
| 6,417,993 B1 | * 7/2002 | Kant et al. ............... 360/244.6 |
| 6,469,872 B1 | * 10/2002 | Kant et al. ................ 360/265.7 |
| 6,631,553 B1 | * 10/2003 | Schmidt et al. ............... 29/757 |
| 2003/0154595 A1 | * 8/2003 | Cruz et al. ..................... 29/737 |

* cited by examiner

Primary Examiner—William Klimowicz
(74) Attorney, Agent, or Firm—Fellers, Snider, et al.

(57) ABSTRACT

An actuator assembly including one or more actuator arms, wherein each of the actuator arms defines a clasp hole and a clamp-opening hole and a slot running between the clasp hole and clamp-opening hole, and optionally, a second slot running from the clasp hole to a distal end of the actuator arm, thereby creating two clasp fingers. A flex suspension assembly is included with a protrusion, such as a boss and a head on a distal end. The flex suspension assembly is coupled to the actuator arm by resiliently increasing the diameter of the clasp hole so as to allow the boss on the flex suspension assembly to be inserted into the clasp hole. With the boss is inserted, the clasp hole is allowed to revert to its original diameter, thereby clamping the boss in the clasp hole. A method for assembly is also provided.

14 Claims, 24 Drawing Sheets

APPARATUS AND METHOD FOR COUPLING A FLEX SUSPENSION ASSEMBLY TO AN ACTUATOR ASSEMBLY

RELATED APPLICATIONS

This application claims priority of U.S. provisional application Serial No. 60/295,275, filed Jun. 1, 2001 and U.S. provisional application Serial No. 60/311,727, filed Aug. 10, 2001.

FIELD OF THE INVENTION

This application relates generally to a disc drive data storage device including an actuator assembly and more particularly to a method and apparatus for coupling one or more flex suspension assemblies to one or more actuator arms of an actuator assembly.

BACKGROUND OF THE INVENTION

In a typical disc drive, one or more flex suspension assemblies (FSAs) each carry a head for reading and writing from and to one or more magnetic discs. An actuator assembly comprises one or more actuator arms used to carry the one or more FSAs and attached heads for placement over the magnetic discs for reading and writing to and from the magnetic discs. It is necessary to couple the one or more FSAs to the one or more actuator arms on the actuator assembly. This attachment process needs to be conducted for actuator assemblies provided in test apparatuses, which are utilized to test the mechanical and electrical properties of the FSAs, for multi-disc writers, which are used to write servo tracks and other data to multiple discs at one time, and to typical disc drives, which are used to store and retrieve data from a magnetic disc.

Historically, an FSA was coupled to an actuator arm using a mounting plate attached to an FSA, the mounting plate including a boss that was sized to fit into an opening defined in an actuator arm provided as part of an actuator assembly. With the boss in place, a swaging technique would be used to attach the boss to the actuator arm. The swaging technique involved passing one or more specifically sized balls through the boss so as to deform the boss relative to the opening in the actuator arm, thereby fixing the FSA in place.

However, current techniques used to fix the FSA to the actuator arm may alter the fly characteristics of the actuator arm. Stresses placed on an actuator arm during coupling and/or removal of the FSA may result in deformation of the actuator arm. An irregularly-shaped actuator arm can exhibit sporadic fly characteristics, causing vibrations, pitches, and rolls that may effect head placement over the magnetic disc. Further, current techniques impart stresses on the actuator arms such that a single actuator arm may only be used with several FSAs before the actuator arm must be replaced. In addition, prior art techniques may make it difficult or impossible to remove an FSA from an actuator arm, or, alternatively, prior art techniques for attaching the FSA to the actuator arm may not provide the necessary clamping force to maintain the coupling between the FSA and the actuator arm. Moreover, prior art materials used to make the actuator arms may exhibit magnetic properties that may interfere with reading and writing from and to the magnetic disc.

Accordingly there is a need for an improved system and method used to couple FSAs to actuator arms.

SUMMARY OF THE INVENTION

Against this backdrop the present invention has been developed. In an exemplary embodiment of the invention, an actuator assembly includes one or more actuator arms, wherein each of the actuator arms defines a clasp hole and a clamp-opening hole. In addition, a slot in the actuator arm runs between the clasp hole and the clamp-opening hole, and optionally, a second slot is defined in the actuator arm running from the clasp hole to a distal end of the actuator arm, thereby creating two clasp fingers.

A flex suspension assembly (FSA) is included with a protrusion, such as a boss, disposed on a proximal end and a head on a distal end of the FSA. In order to releasably couple the FSA to the actuator arm, a camming rod or other device is inserted into the clamp-opening hole. The camming rod is actuated to resiliently increase the diameter of the clasp hole so as to allow the boss disposed on the FSA to be inserted into the clasp hole. Further, once the boss is inserted and the camming rod removed from the clamp-opening hole, the clasp hole resiliently attempts to revert to its original diameter, thereby clamping and retaining the boss in the clasp hole. In this manner, the FSA is fixedly coupled to the actuator arm. The FSA can also be removed from the actuator arm in a similar manner.

These and various other features as well as advantages which characterize embodiments of the present invention will be apparent from a reading of the following detailed description and a review of the associated drawings.

DETAILED DESCRIPTION

Figure 1:
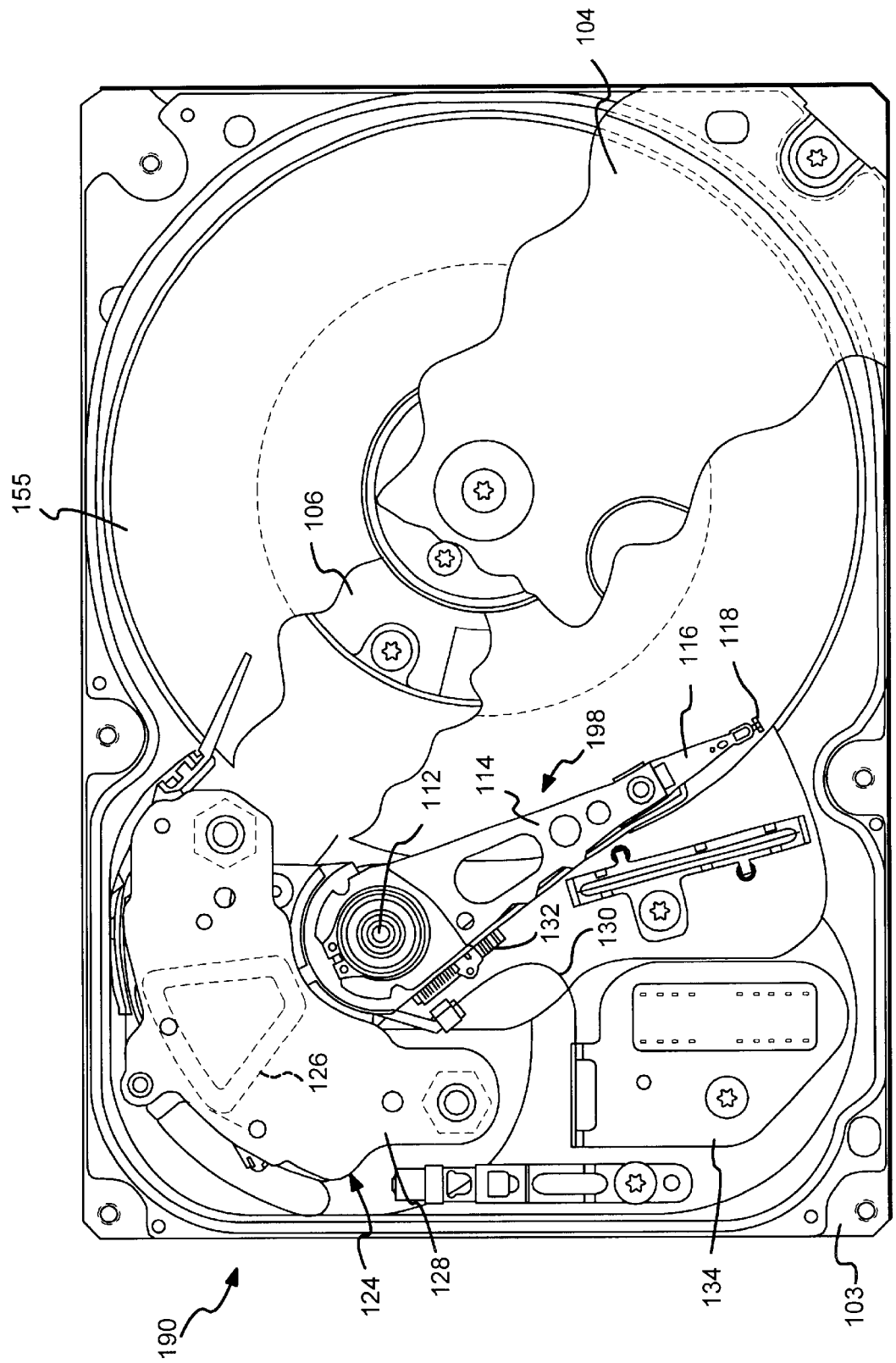
FIG. 1 is a plan view of a disc drive incorporating an exemplary embodiment of the present invention showing the primary internal components of the disc drive.

A disc drive 190 constructed in accordance with a preferred embodiment of the present invention is shown in FIG. 1. The disc drive 190 includes a base 103 to which various components of the disc drive 190 are mounted. A top cover 104, shown partially cut away, cooperates with the base 103 to form an internal, sealed environment for the disc drive in a conventional manner. The components include a spindle motor 106 that rotates one or more magnetic data storage discs 155 at a constant high speed. Information is written to and read from tracks on the discs 155 through the use of an actuator assembly 198, which rotates during a seek operation about a bearing shaft assembly 112 positioned adjacent the discs 155. The actuator assembly 198 includes a plurality of actuator arms 114 which extend towards the discs 155, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 155.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 198 pivots about the bearing shaft assembly 112, and the heads 118 are caused to move across the surfaces of the discs 155.

A flex assembly 130 provides the requisite electrical connection paths for the actuator assembly 198 while allowing pivotal movement of the actuator assembly 198 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 103 to a disc drive printed circuit board (not shown) mounted to the bottom side of the disc drive 190.

Figure 2:
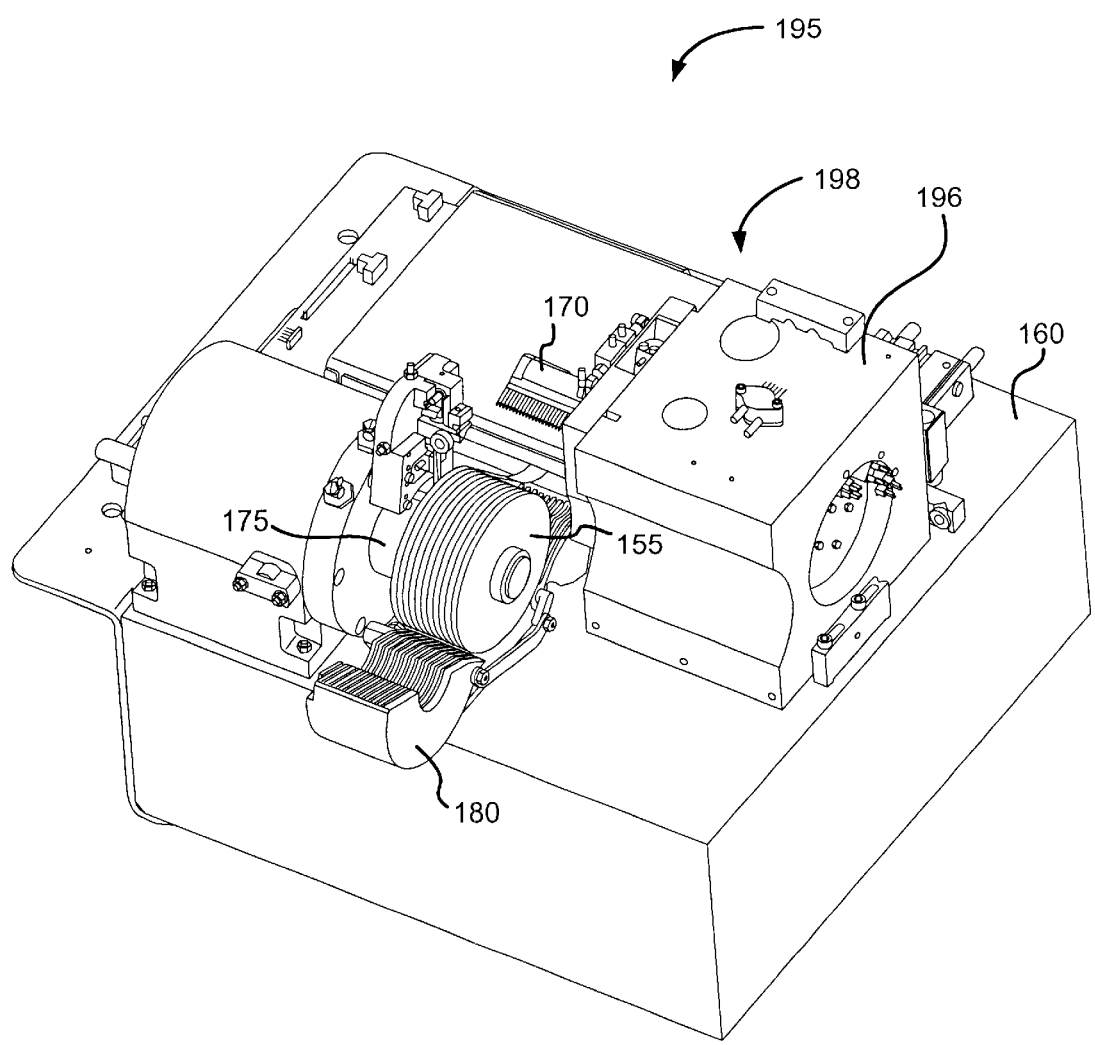
FIG. 2 is a perspective view of a multi-disc servo writer incorporating an exemplary embodiment of the present invention.
Figure 3:
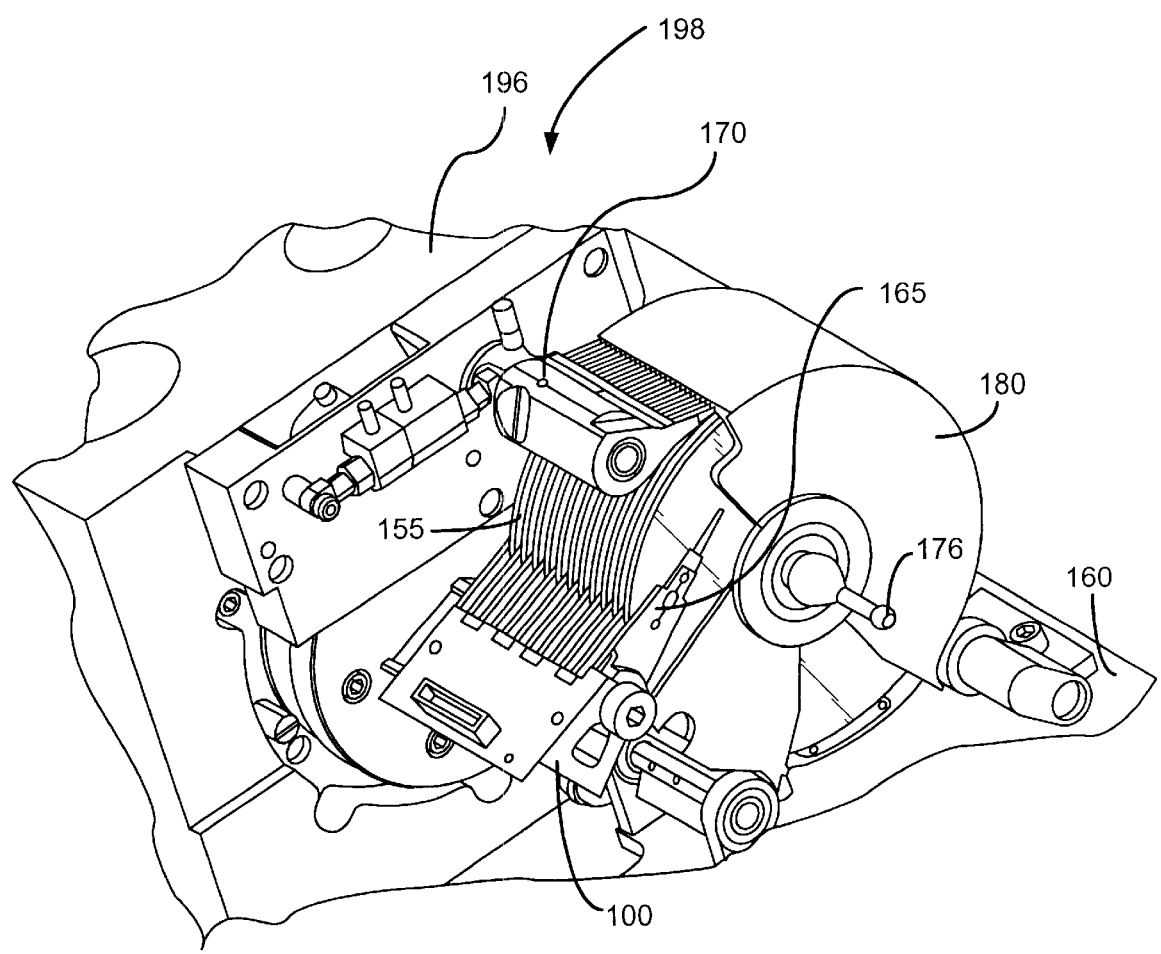
FIG. 3 is a close-up perspective view of a portion of the exemplary multi-disc writer of FIG. 2.

In FIGS. 2 and 3, a multi-disc servo writer 195 is shown. The multi-disc writer 195 may be used to record a servo pattern onto a magnetic disc using servo-recording heads attached to an actuator assembly 198. Servo pattern is recorded on the disc 155 during drive manufacture. This servo pattern is utilized by the drive servo control system to accurately position the heads 118 over a desired track. The servo information may be written on the discs 155 after drive assembly during the manufacturing process. Alternatively, the servo information may be prewritten to the discs separately in a multi-disc servo writer prior to assembly of each of the discs 155 onto a spin motor 106 in a disc drive 190.

FIGS. 2 and 3 illustrate different aspects of the multi-disc servo writer 195 in accordance with one embodiment of the present invention. The actuator assembly 198 of the vertically-oriented multi-disc servo writer 195 includes, among other features, a motor assembly 196 and an E-block 100 (shown only in FIG. 3) for recording servo patterns onto target magnetic discs 155; a cam 170 used to load the heads coupled to the E-block 100 on and off the magnetic discs 155; a dam 180 used to control the airflow around the magnetic discs 155; and a spindle hub assembly 175 for vertically positioning one or more of the magnetic discs 155 for the simultaneous writing of servo pattern onto each disc 155. The vertically-oriented multi-disc servo writer 195 sits upon a substantially immobile horizontally positioned, or substantially horizontally positioned, platform 160. The spindle hub assembly 175 is secured to the platform 160 in close relation to the actuator assembly 198, so that the spindle hub 176 of the spindle hub assembly 175 extends horizontally towards the actuator assembly 198. As such, the magnetic discs 155 on the spindle hub 176 are horizontally interspersed from one another, each disc surface oriented vertically or substantially vertically with respect to the platform surface 160. The actuator arms 165 of the E-block 100 are rotated across the magnetic disc 155 surfaces.

It should be understood that the E-block 100 could be used as part of the actuator assembly 198 in the disc drive 190 shown in FIG. 1, and further that the E-block 100 could also be used as the E-block 100 in the multi-disc servo writer 195 illustrated in FIGS. 2 and 3. Other uses are also possible. For example, embodiments of the E-block disclosed herein may further be used in a test apparatus used to test the mechanical and electrical properties of a flex suspension assembly. In addition, the embodiments of the E-block disclosed may be utilized in other disc drive configurations used to read and write data from and to a magnetic disc. Other uses may also become apparent to one skilled in the art.

Figure 4:
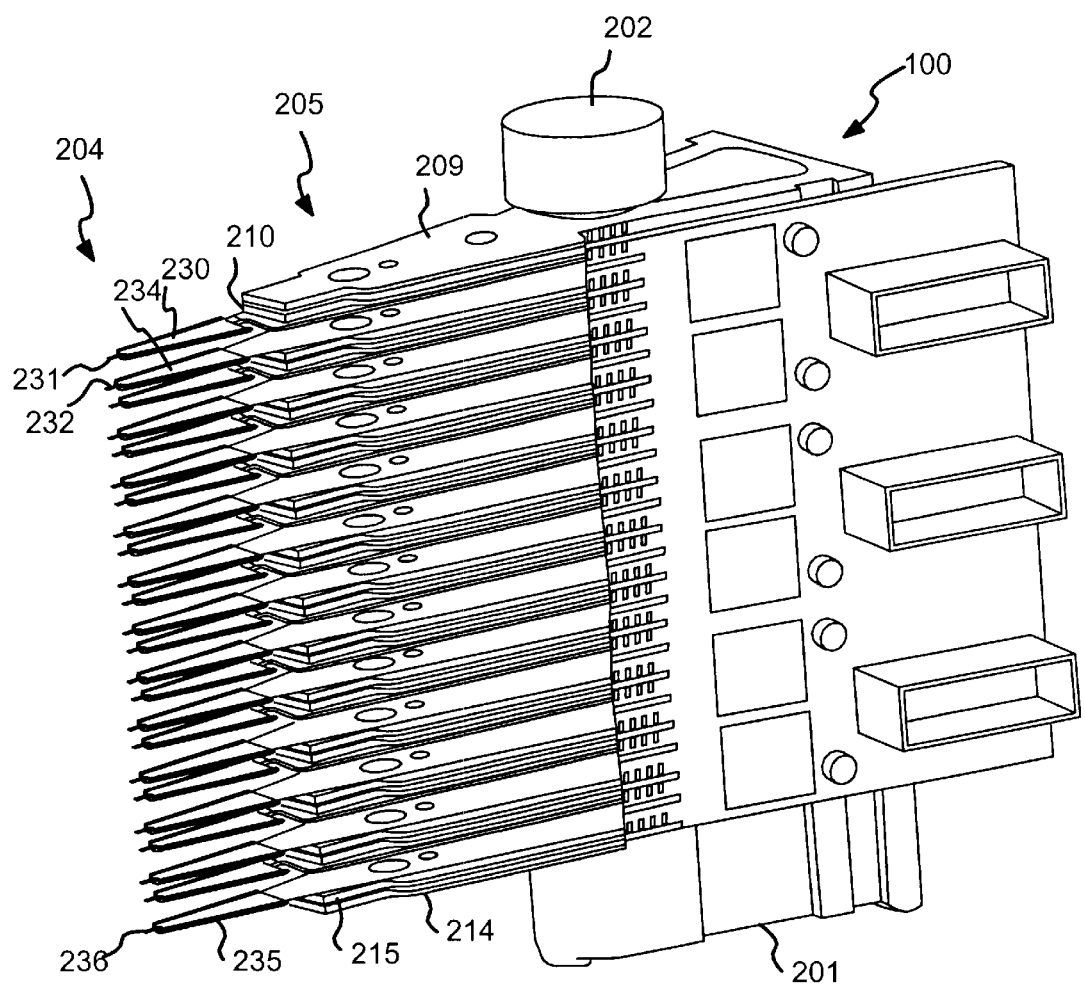
FIG. 4 is a perspective view of an E-block in accordance with an exemplary embodiment of the present invention.

Referring now to FIG. 4, an exemplary E-block 100 is shown in perspective including an E-block body 201 with a plurality of actuator arms 205. The E-block body 201 shown in FIG. 4 is coupled to a disc drive via a bolt 202. A plurality of flex suspension assemblies 206 is coupled to the plurality of actuator arms 205, except that outer actuator arms 209 and 214 are not coupled to flex suspension assemblies.

An upper actuator arm 210 and a lower actuator arm 215 as well as an upper flex suspension assembly 230 and a lower flex suspension assembly 235 will be described in detail, however, it should be understood that each of the plurality of actuator arms 205 and the plurality of flex suspension assemblies 206 have a similar structure. Further, although the E-block 100 is illustrated with the plurality of actuator arms 205 (24 shown in all) and the plurality of flex suspension assemblies 206 (22 shown in all), it should be understood that the present invention is equally applicable to a single actuator arm and flex suspension assembly used in conjunction with a variety of types of disc drives, as described above.

The flex suspension assemblies 230 and 235 are coupled at a distal end to heads 231 and 236 for reading and writing data from and to a magnetic disc. The head 231 is coupled to the flex suspension assembly 230 in an opposing fashion with respect to a head 232 on an adjacent flex suspension assembly 234, as discussed in greater detail below.

Figure 5:
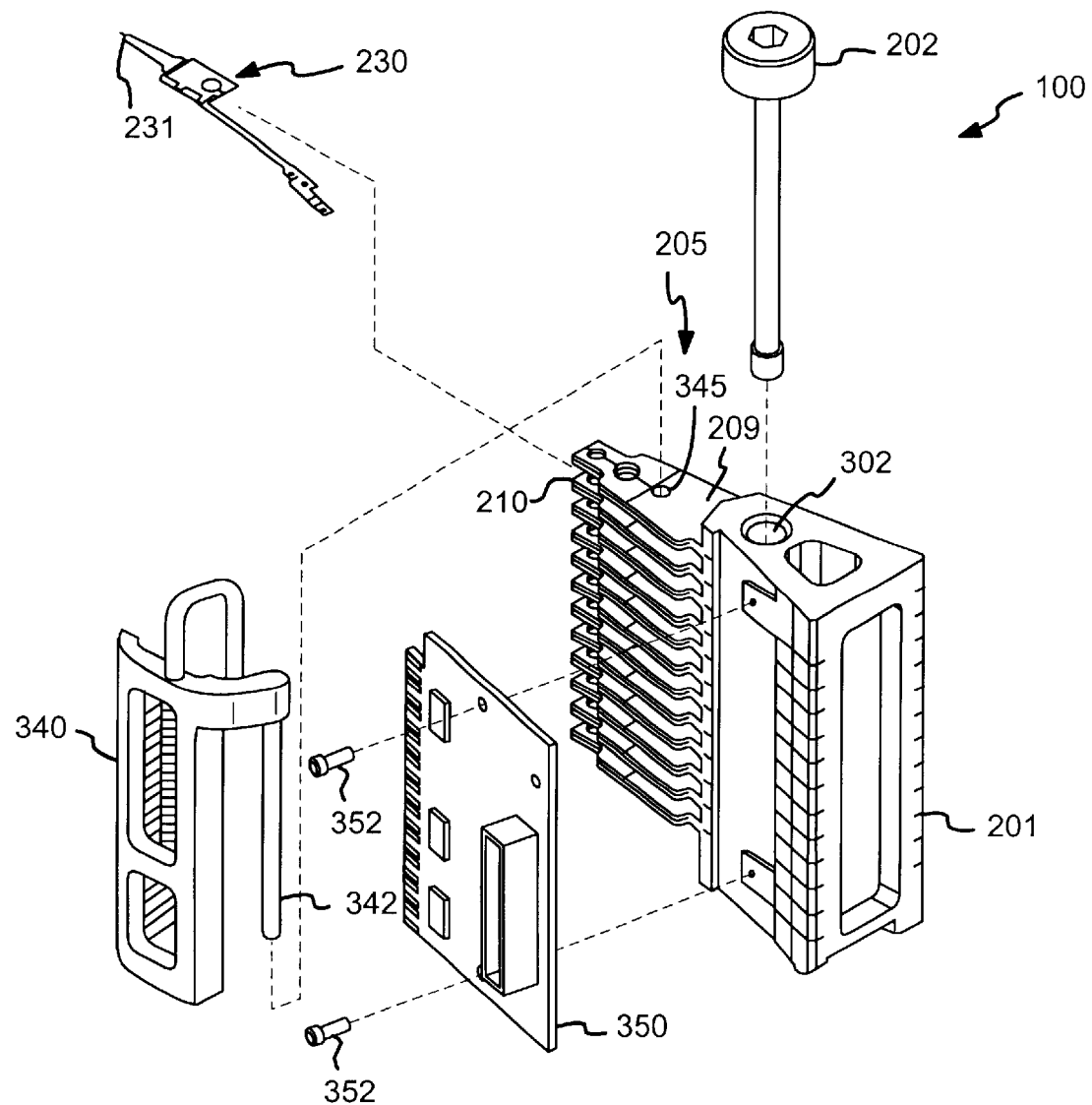
FIG. 5 is an exploded perspective view of the E-block shown in FIG. 4.

In FIG. 5, the exemplary E-block 100 is illustrated in exploded form. The bolt 202 is inserted into a bearing bore 302 defined by the E-block body 201. A comb retainer 342 of a comb 340 is inserted through a comb hole 345 defined by each of the plurality of actuator arms 205. The comb functions to support the flex suspension assemblies and to maintain spacing between adjacent heads on the flex suspension assemblies. A pre-amplifier card 350 is coupled to the E-block body 201 via screws 352. The pre-amplifier card 350 functions to amplify the signals from the magnetic discs by the heads before the signals are passed to other downstream systems.

Figure 6:
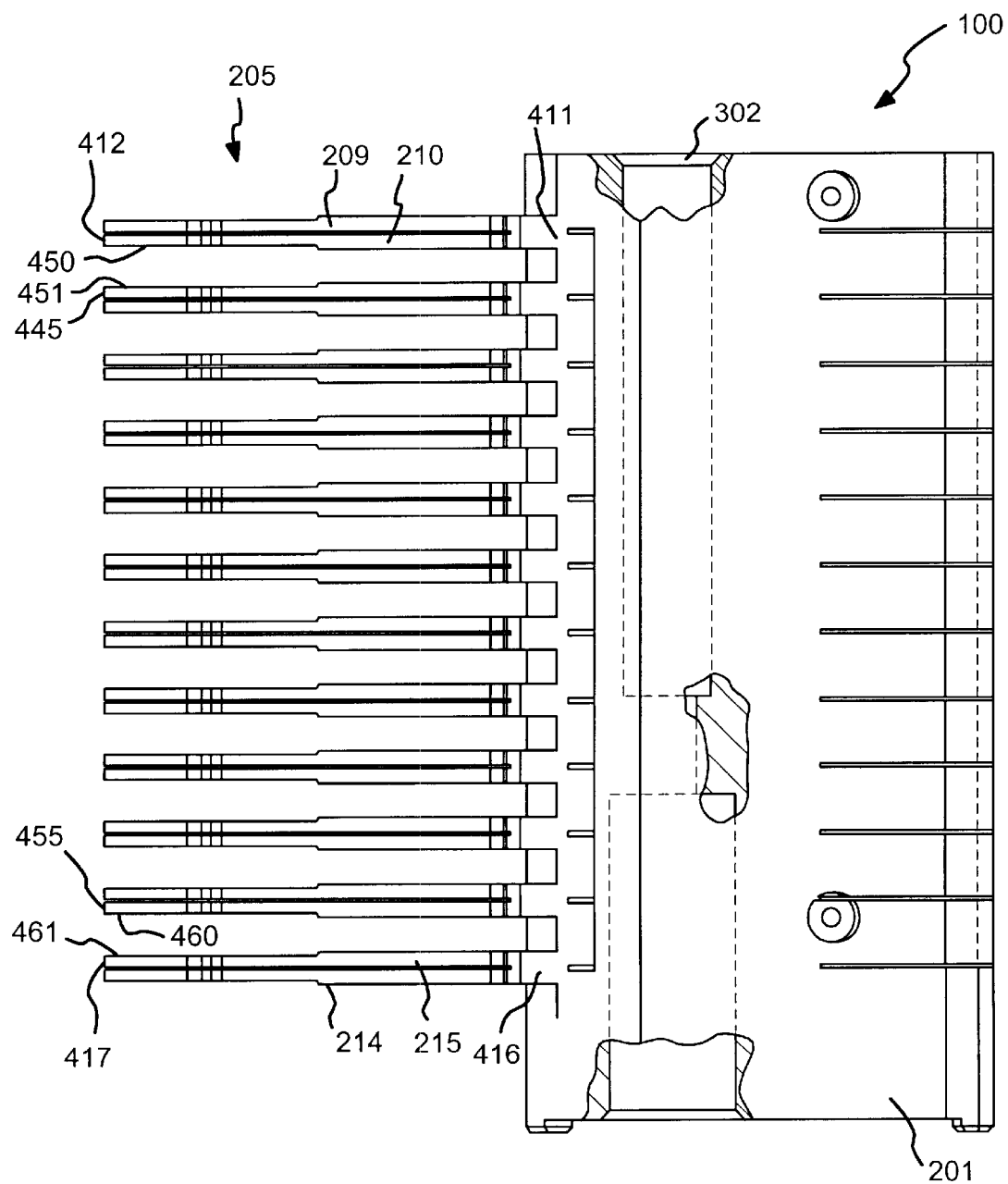
FIG. 6 is a side view of the E-block shown in FIGS. 4 and 5.

A side view of the exemplary E-block 100 is provided in FIG. 6. Proximal ends 411 and 416 of the actuator arms 210 and 215 are coupled to the E-block body 201, and distal ends 412 and 417 extend outwardly from the E-block body 201. Flex suspension assemblies are coupled to the actuator arms 205 in opposing fashion. For example, a first flex suspension assembly (not shown) would be coupled to the actuator arm 210 on a bottom surface 450 with a head of the first flex suspension assembly positioned opposite the bottom surface 450, while a second flex suspension assembly (also not shown) would be coupled to an adjacent actuator arm 445 on a top surface 451 with a head facing the head on the first flex suspension assembly. A similar arrangement is created for the actuator arm 215 with a top surface 461 and an adjacent actuator arm 455 with a bottom surface 460, as well as the rest of the plurality of actuator arms 205 and the plurality of flex suspension assemblies 206.

Figure 7:
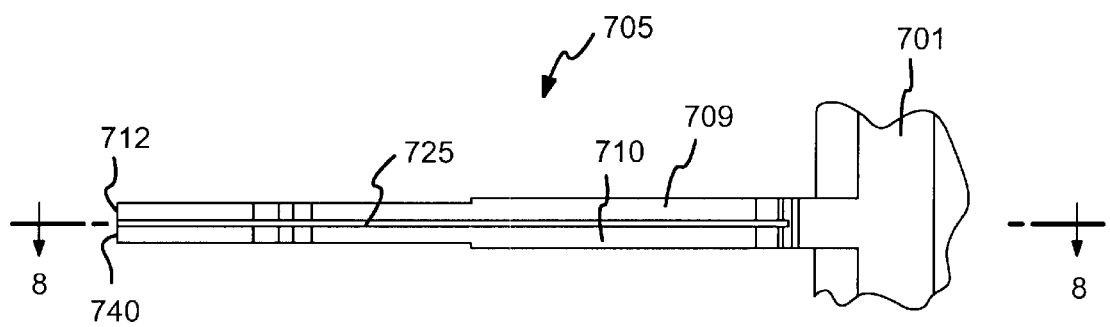
FIG. 7 is a side view of a portion of the E-block of FIG. 6 including two adjacent actuator arms.

In FIG. 7, a portion of an E-block body 701, similar to that shown in FIG. 6, is shown with a close up view of two adjacent actuator arms 709 and 710. The actuator arms 709 and 710 include distal ends 712 and 740, respectively, as well as a slot 725 defined between the actuator arm 709 and the actuator arm 710. The slot 725 may vary in size and preferably is 10 thousandths of an inch thick. The slot 725 at least partially separates the actuator arm 709 from the actuator arm 710, running from the distal ends 712 and 740 through the E-block body 701.

Figure 8:
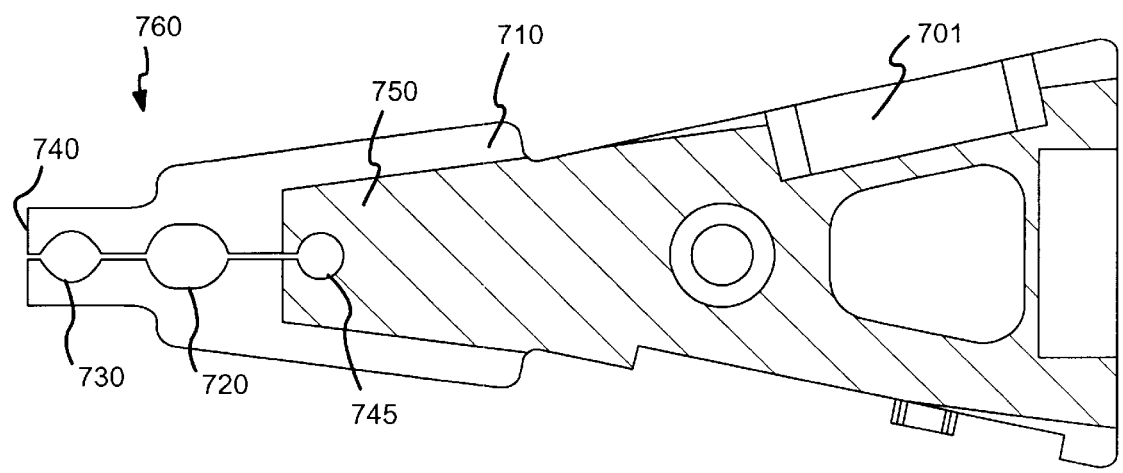
FIG. 8 is a cross-sectional view taken along line 8—8 of FIG. 7 illustrating a first embodiment of an actuator arm in accordance with an exemplary embodiment of the present invention.

In a first embodiment, a cross-section along line A—A of FIG. 7 is shown in FIG. 8. The actuator arm 710 includes a comb hole 745 and a clamp-opening hole 720 and clasp hole 730, discussed in detail below. A connecting area 750 illustrates the area in which the actuator arm 709 is connected to the actuator arm 710. The slot 725 divides the actuator arm 710 from the actuator arm 709 generally at portion 760 of the actuator arms adjacent to the distal end 740.

Figure 9:
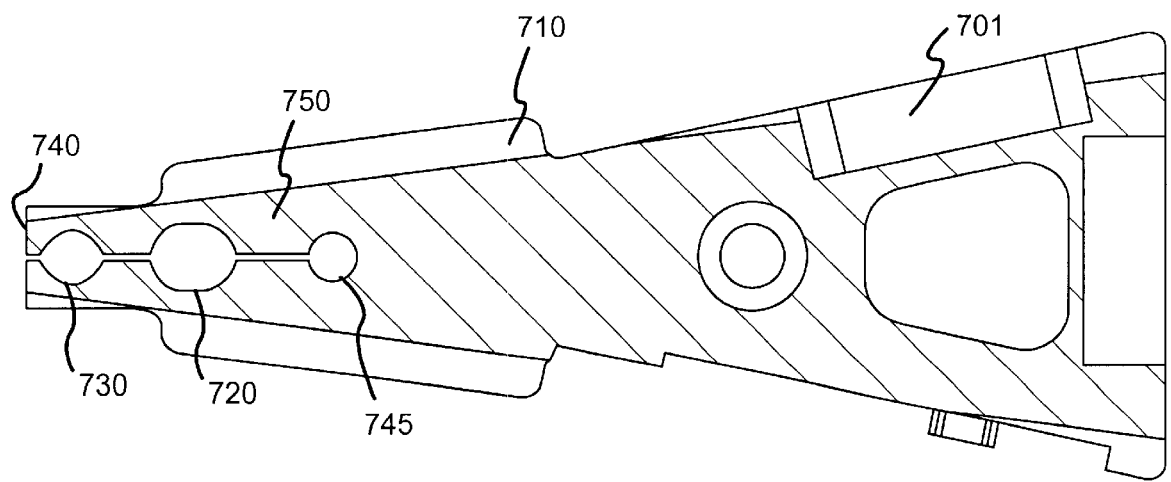
FIG. 9 is another cross-sectional view as taken along line 8—8 of FIG. 7 illustrating a second embodiment of an actuator arm in accordance with an exemplary embodiment of the present invention.

In a second embodiment, a cross-section along line A—A of FIG. 7 is shown in FIG. 9. In this second embodiment, the connecting area 750 between the actuator arm 709 and the actuator arm 710 extends longitudinally to the distal end 740 of the actuator arm. In this configuration, a larger portion of the actuator arm 709 is connected to the actuator arm 710, and the slot 725 divides only a small portion of each actuator arm. This configuration may be advantageous, in that vibrational forces, or resonant frequencies, between adjacent arms 709 and 710 may be reduced due to the increased connecting area 750.

Figure 10:
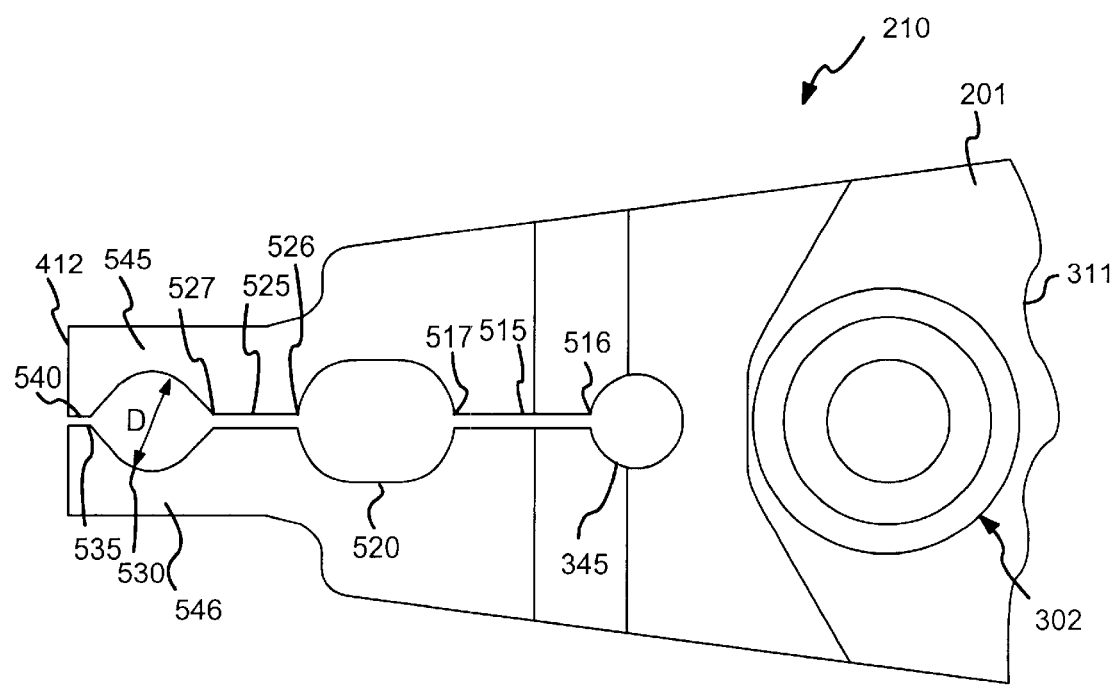
FIG. 10 is a top plan view of distal a portion of an actuator arm in accordance with an exemplary embodiment of the present invention.

Referring now to FIG. 10, a top view of the exemplary actuator arm 210 is provided. At least two holes are defined by each of the plurality of actuator arms 205, including a clamp-opening hole 520 and a clasp hole 530. The holes 520 and 530 are oval or elliptical in shape and may be formed so as to optimize their resiliency, as described below.

A first slot 515 is defined by the actuator arm 210 running from a point 516 at the comb hole 345 to a point 517 at the clamp-opening hole 520. A second slot 525 is defined by the actuator arm 210 running from a point 526 at the clamp-opening hole 520 to a point 527 at the clasp hole 530. Finally, in this first embodiment, an end slot 540 is defined by the actuator arm 210 running from a point 535 at the clasp hole 530 to the distal end 412 of the actuator arm 210, thereby defining clasp fingers 545 and 546 and making the actuator arm 210 of the "opened-end" variety. As will be described in detail below, the slots 515, 525, and 540 allow a diameter D of the clasp hole 530 to be resiliently increased to facilitate the coupling of the actuator arm 210 to a flex suspension assembly.

It should be understood that the slots 515, 525, and 540 may be defined to run vertically through the entire thickness of the actuator arm 210, or, alternatively, one or more of the slots may be formed so as to extend vertically through only a portion of the thickness of the actuator arm 210.

Figure 11:
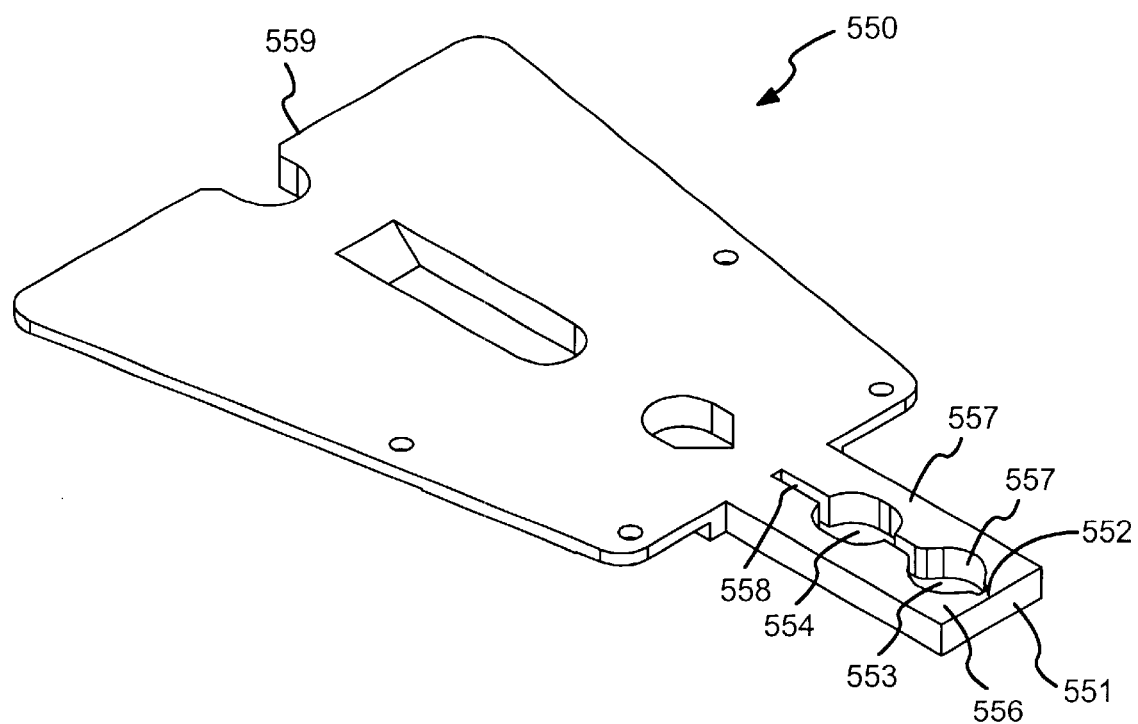
FIG. 11 is a perspective view of an actuator arm in accordance with another exemplary embodiment of the present invention.

In FIG. 11, a perspective view of a second exemplary actuator arm 550 is shown in accordance with the present invention. The actuator arm 550 is similar to the actuator arm 210, including a distal end 551, clasp hole 553, clamp-opening hole 554, a first slot 557 between the clasp hole 553 and the clamp-opening hole 554, and clasp fingers 555 and 556. The actuator arm 550 is a "closed-end" embodiment, meaning that the distal end 551 of the actuator arm 550 does not include an end slot, such as the end slot 540 in the actuator arm 210, but instead is closed via a clamp 552. The clamp 552 may be molded as an integral component of the actuator arm 550 (as shown), or may be a separate component. The clamp 552 functions to join the clasp fingers 555 and 556. An optional second slot 558 is defined by the actuator arm 550 running from the clamp-opening hole 554 toward a proximal end 559 of the actuator arm 550.

Figure 12:
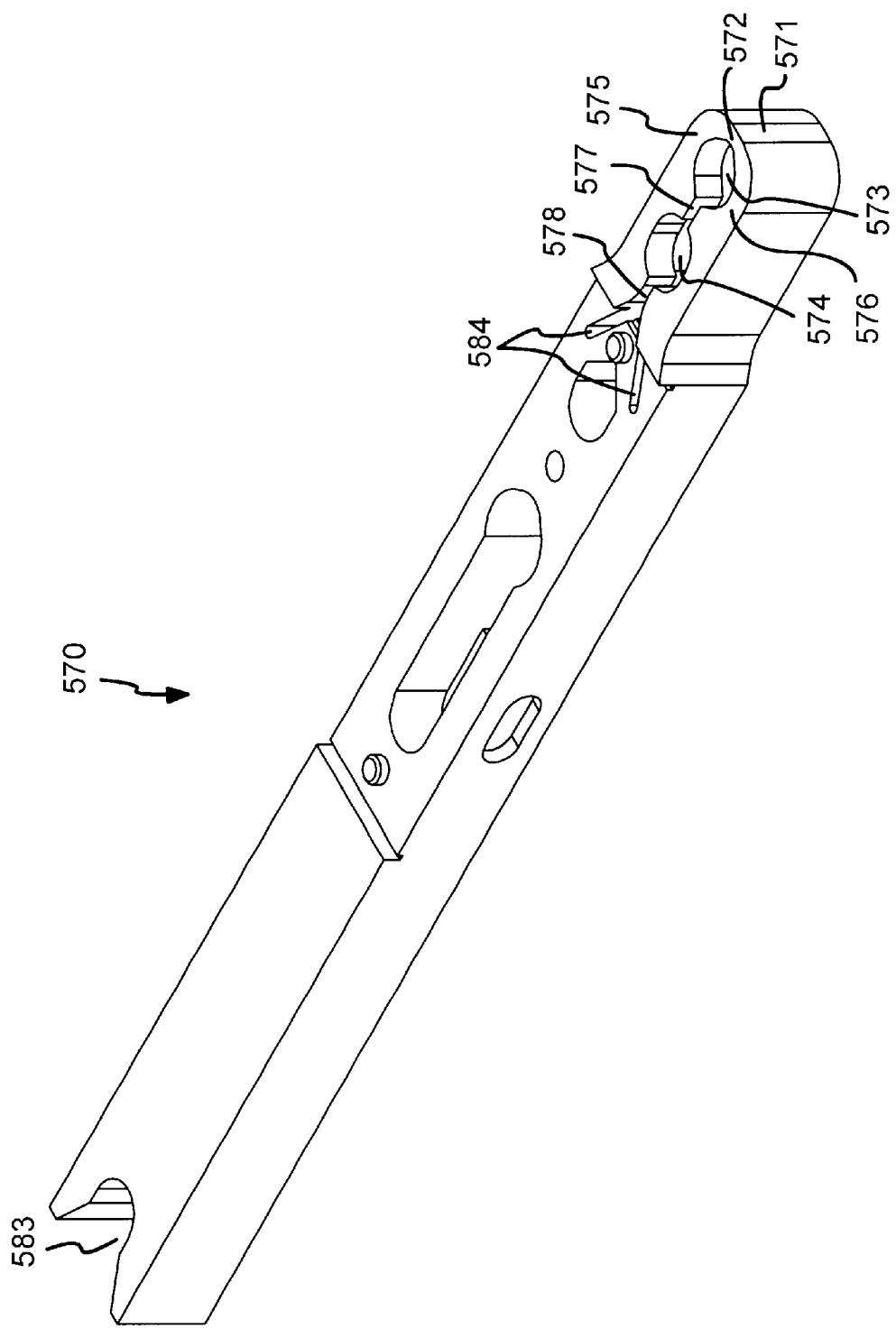
FIG. 12 is a perspective view of an actuator arm in accordance with another exemplary embodiment of the present invention.
Figure 13:
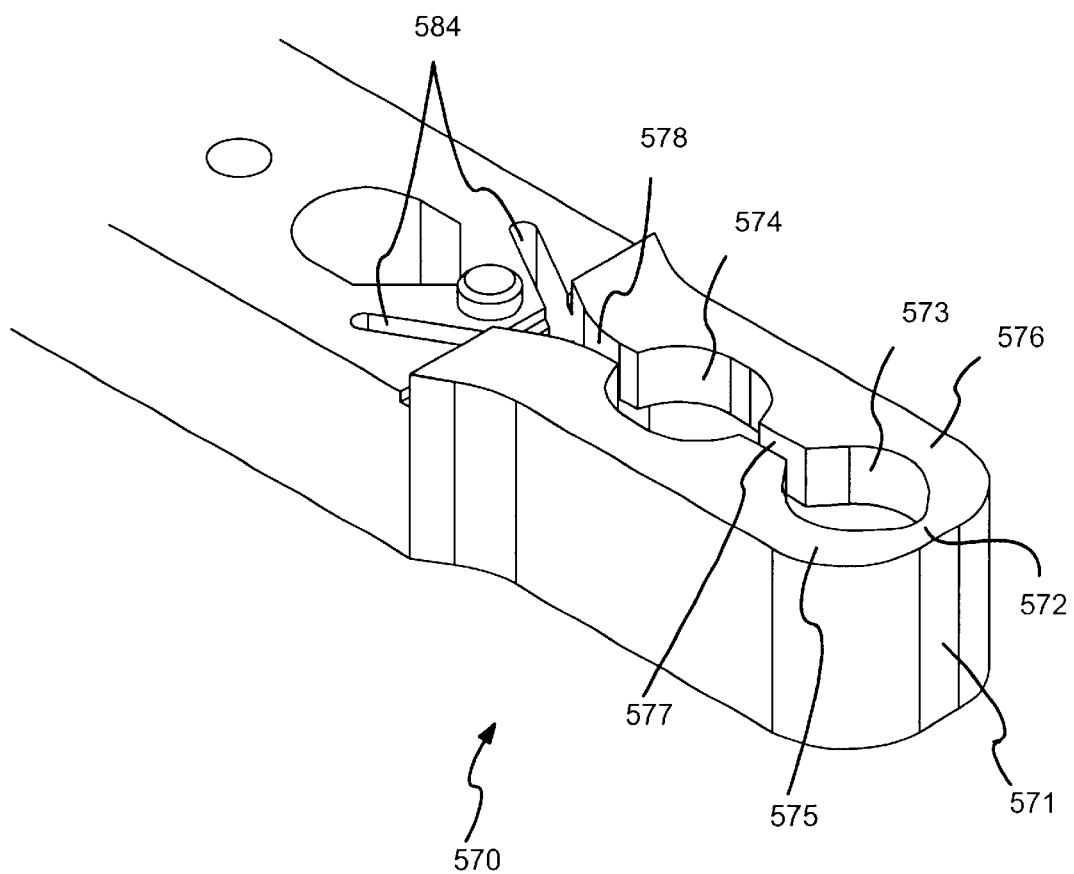
FIG. 13 is a close-up perspective view of the distal portion of the actuator arm of FIG. 12.

Another exemplary embodiment of an actuator arm 570 is shown in FIGS. 12 and 13 according to the present invention. The actuator arm 570 includes a distal end 571, a proximal end 583, a clamp 572, a clasp hole 573, a clamp-opening hole 574, clasp fingers 575 and 576, and a slot 577. Further included is a second slot 578 with branches 584 defined by the actuator arm 570 running from the clamp-opening hole 574 towards the proximal end 583 of the actuator arm 570.

In one example according to the present invention, the actuator arms 550 and 570 may be used as test arms to test the mechanical and electrical characteristics of various flex suspension assemblies. It should be understood that the exemplary actuators arms 550 and 570, as well as the other exemplary actuator arms 210 and 610, may also be used in other contexts as well, such as in a multi-disc writer or a typical disc drive.

Figure 14:
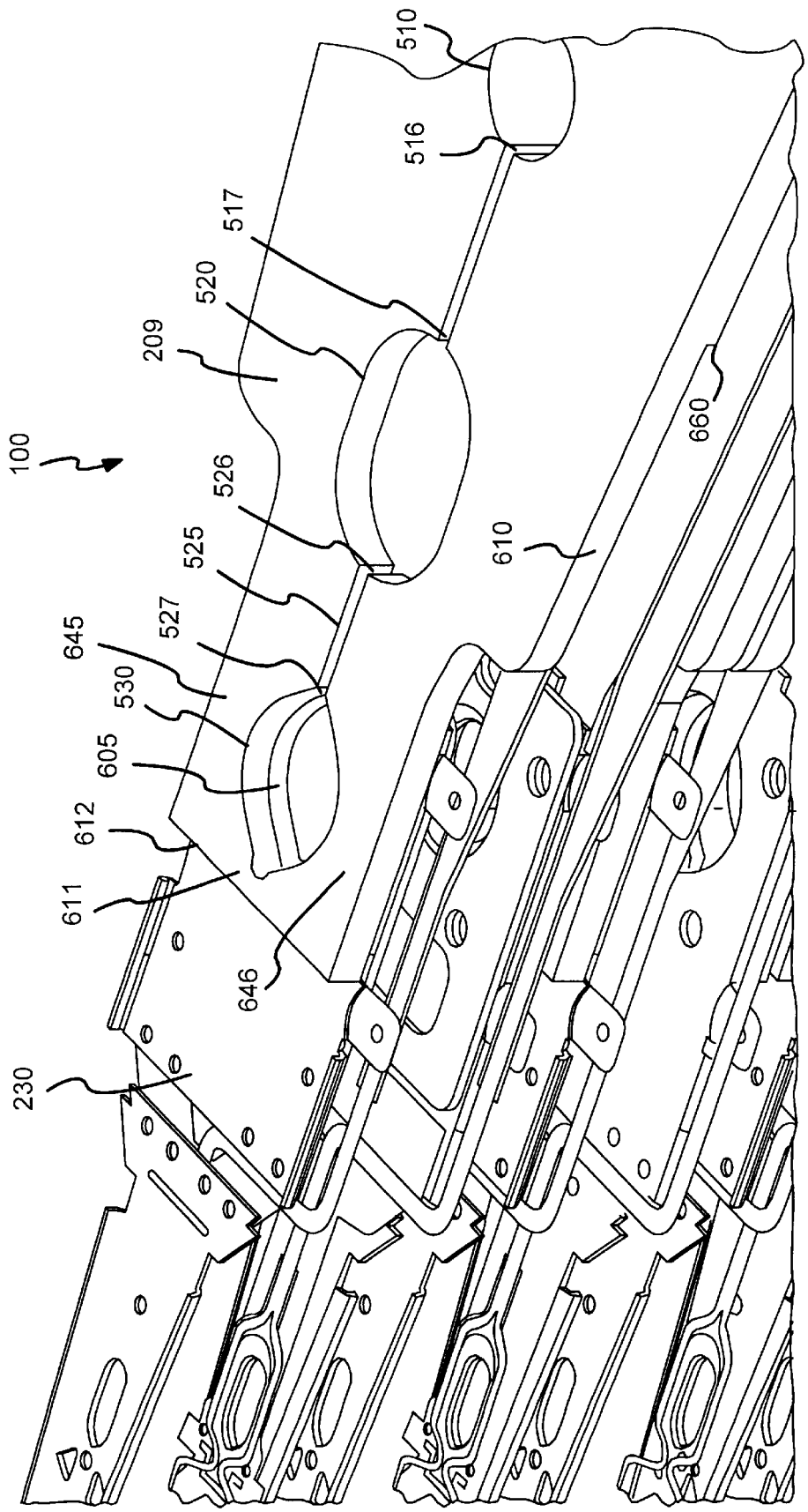
FIG. 14 is a perspective view of a portion of an actuator assembly including actuator arms coupled to flex suspension assemblies in accordance with an exemplary embodiment of the invention.
Figure 15:
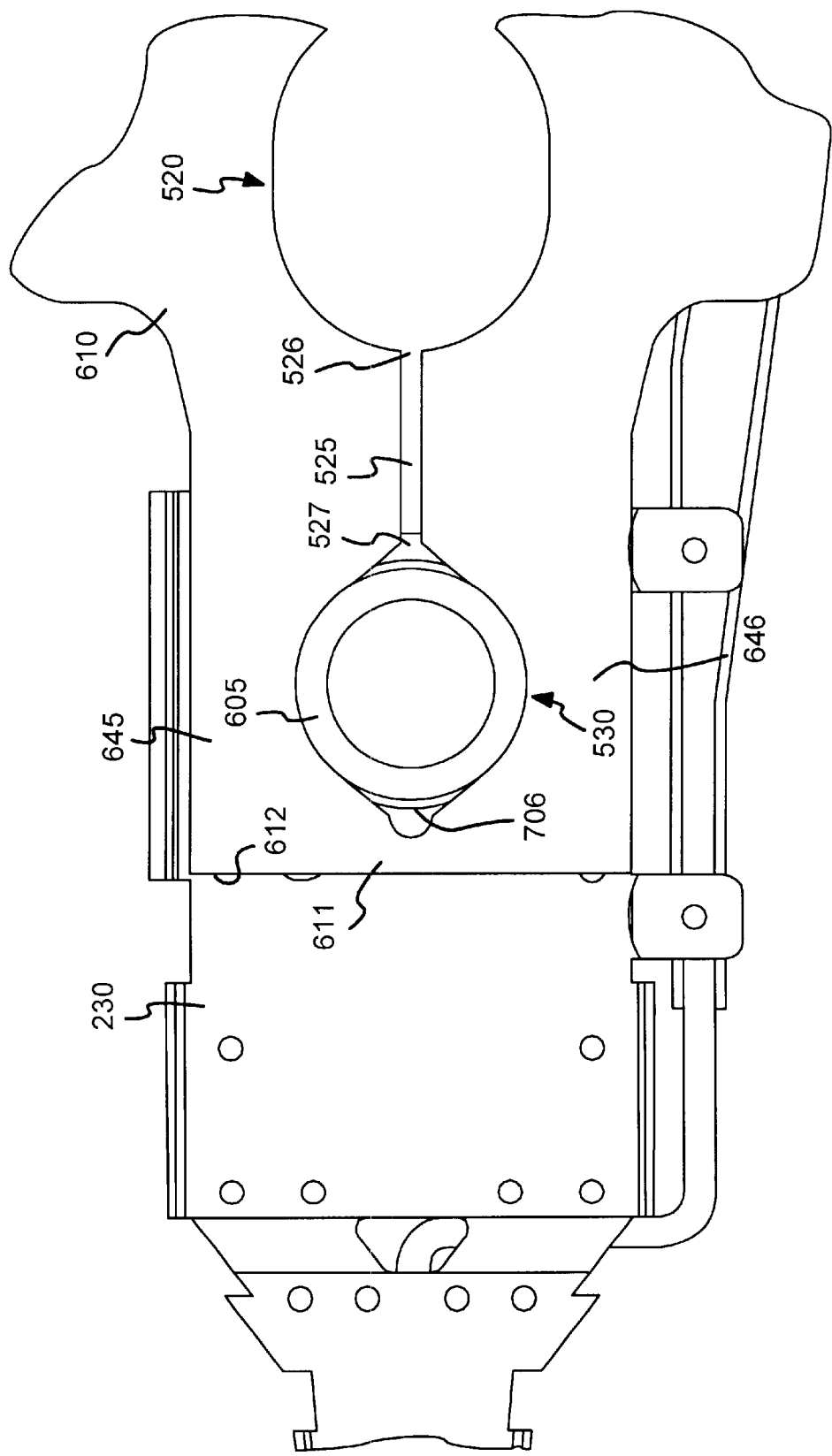
FIG. 15 is a top plan view of a portion of an actuator arm coupled to a flex suspension assembly in accordance with an exemplary embodiment of the invention.

Perspective and top views of a portion of the E-block 100 are shown in FIGS. 14 and 15, with an exemplary actuator arm 610 of the "closed-end" variety with a clamp 611 connecting clasp fingers 645 and 646 at a distal end 612. The actuator arm 610 is shown coupled to the flex suspension assembly 230. A diameter of the clasp hole 530 defined by the actuator arm 610 can be resiliently deformed so as to allow the flex suspension assembly 230 to be coupled to the actuator arm 610. The actuator arm 610 is increased in thickness at a step 660 positioned between the clamp-opening hole 610 and the comb home 510 running to the E-block body 201 so as to provide increased structural integrity.

A boss 605 provided on the flex suspension assembly 230 is disposed within the clasp hole 530 of the actuator arm 610. The boss 605 is sized so that it is small enough that it may be inserted into the clasp hole 530 when the clasp hole 530 is resiliently deformed, causing the clasp fingers 645 and 646 to move away from one another. Further, the boss 605 is large enough that an outer surface 706 will be engaged by and retained in the clasp hole 530 when the clasp hole 530 once again attempts to retain its natural diameter. In other words, the clasp hole functions like a spring to maintain retentive force on the boss. In this manner, the flex suspension assembly 230 may be coupled to the actuator arm 610 so as to retain the flex suspension assembly 230 in place. The other exemplary actuator arms 210, 550, and 570 are coupled to flex suspension assemblies in a similar manner.

It should be understood that the boss 605 may take variety of forms, including circular, square, rectangular, or other such shape more generally described as a protrusion. Further, a combination of two or more protrusions may be used to couple a flex suspension assembly to an actuator arm, wherein one or more protrusions may be engaged by one or more holes defined in the actuator arm.

Figure 16:
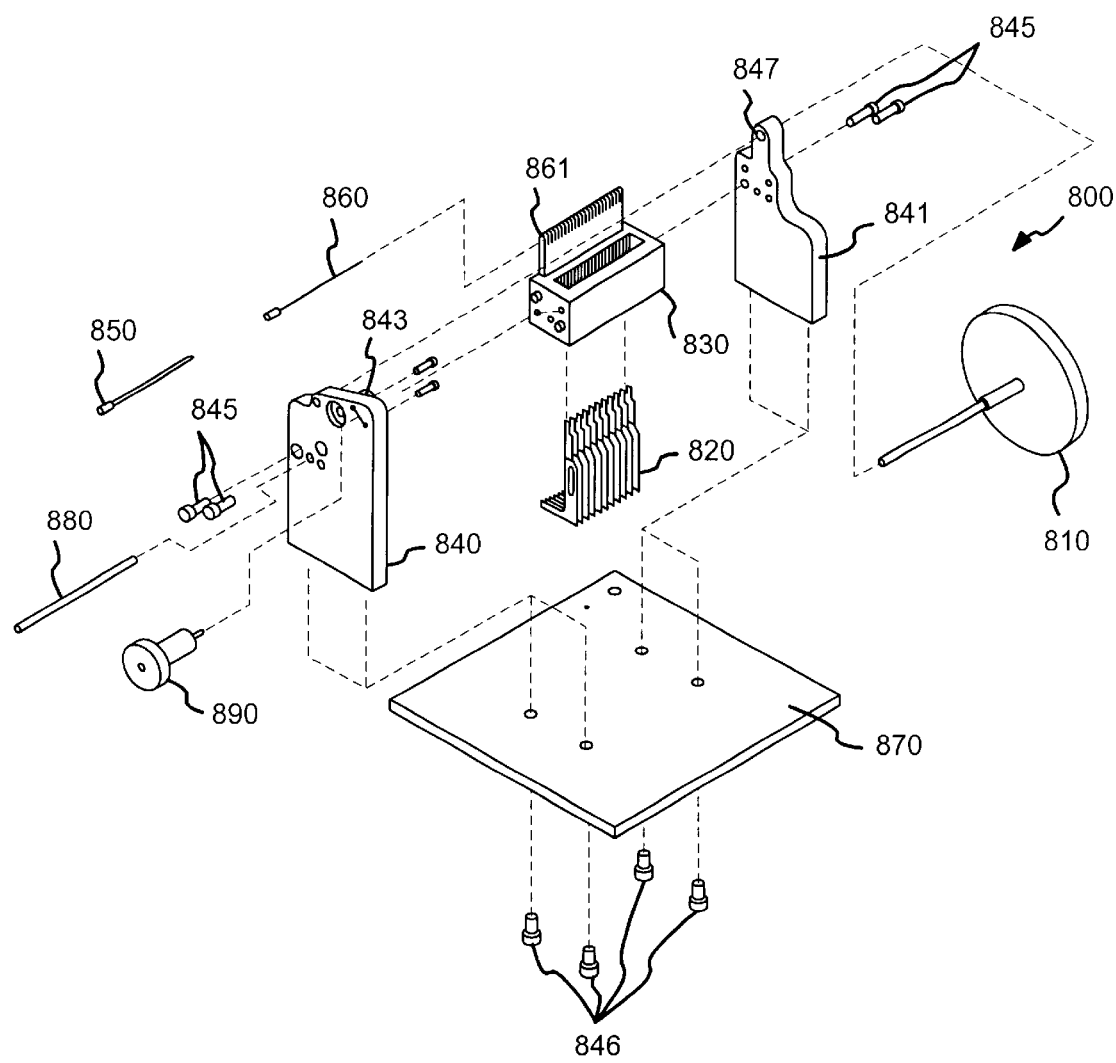
FIG. 16 is an exploded perspective view of an apparatus used to assemble an E-block in accordance with an exemplary embodiment of the invention.
Figure 17:
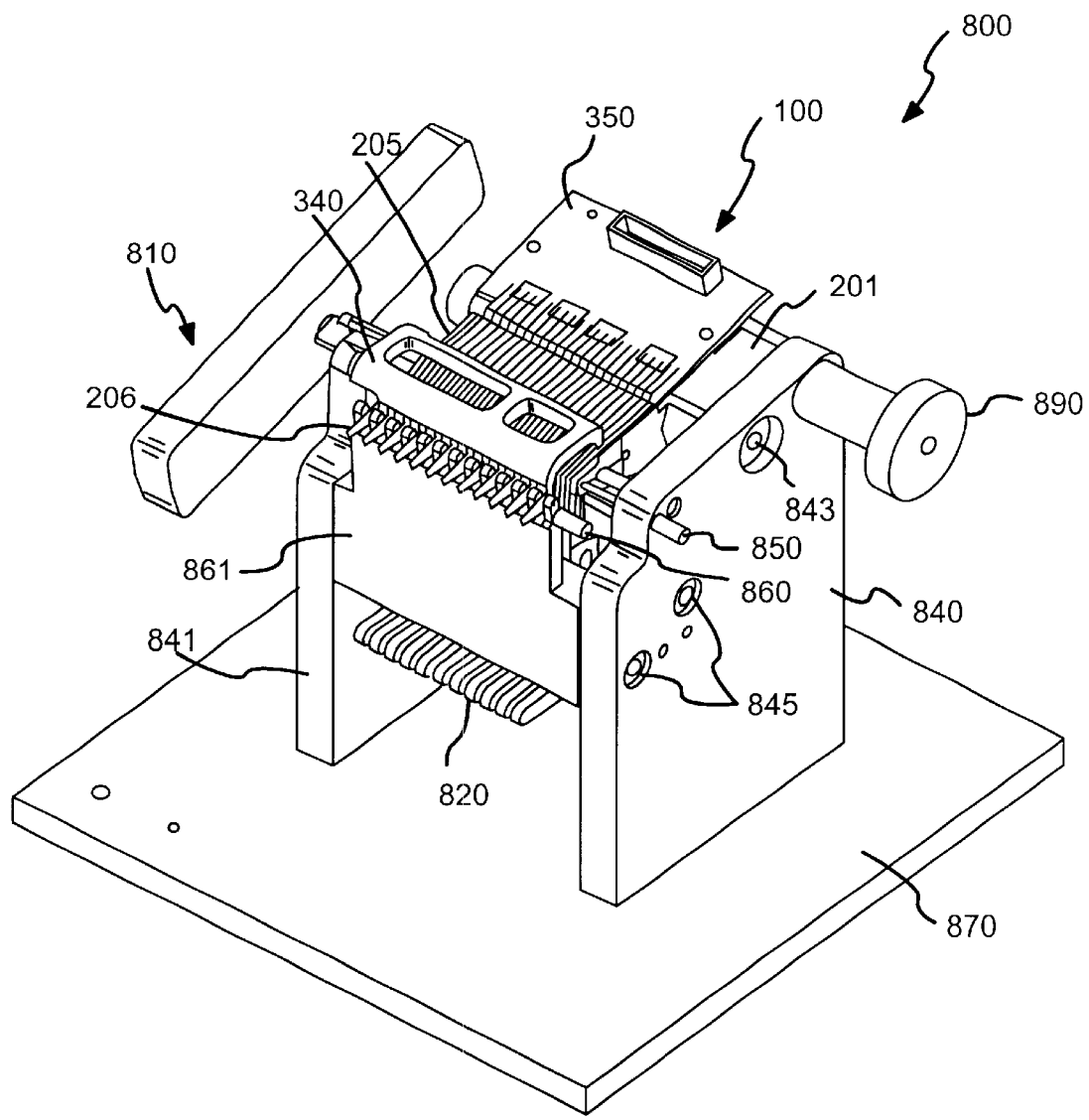
FIG. 17 is a front perspective view of the apparatus shown in FIG. 16 with an E-block attached to the apparatus.
Figure 18:
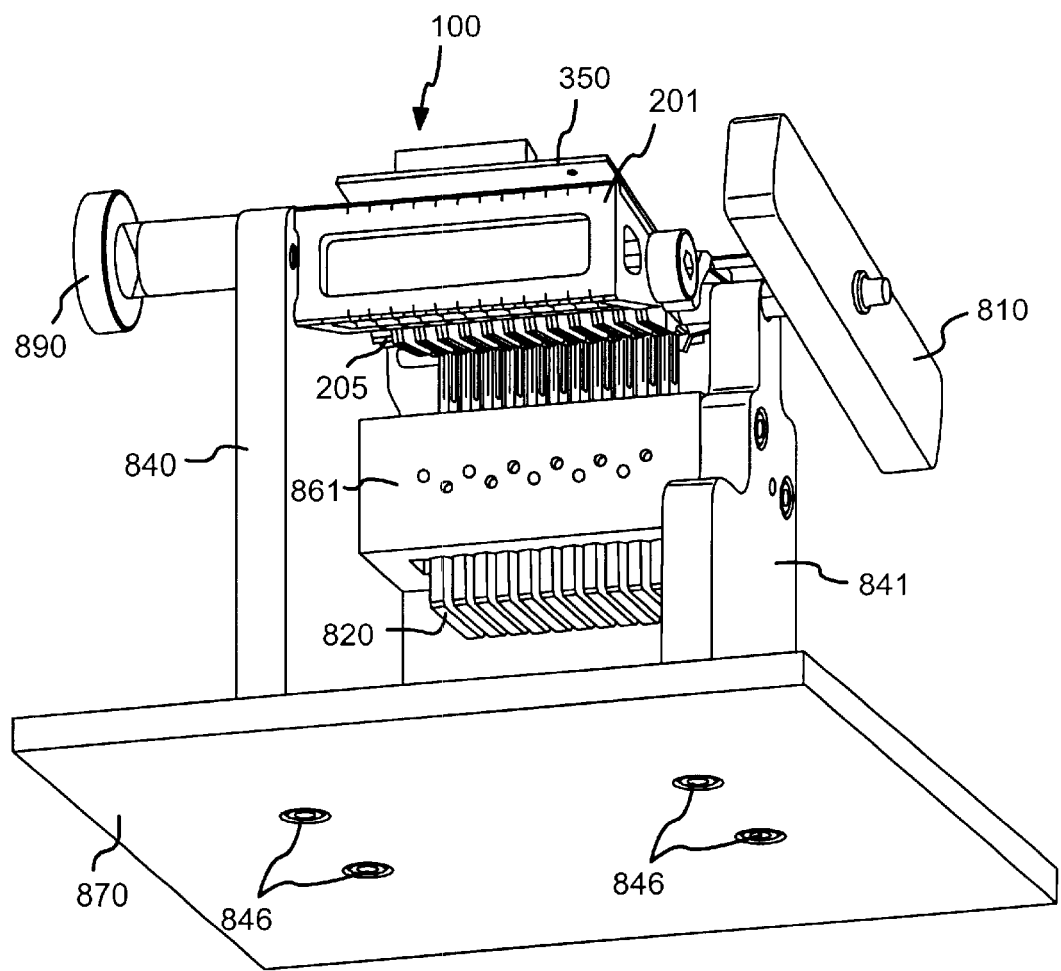
FIG. 18 is a back perspective view of the apparatus of FIG. 17.
Figure 19:
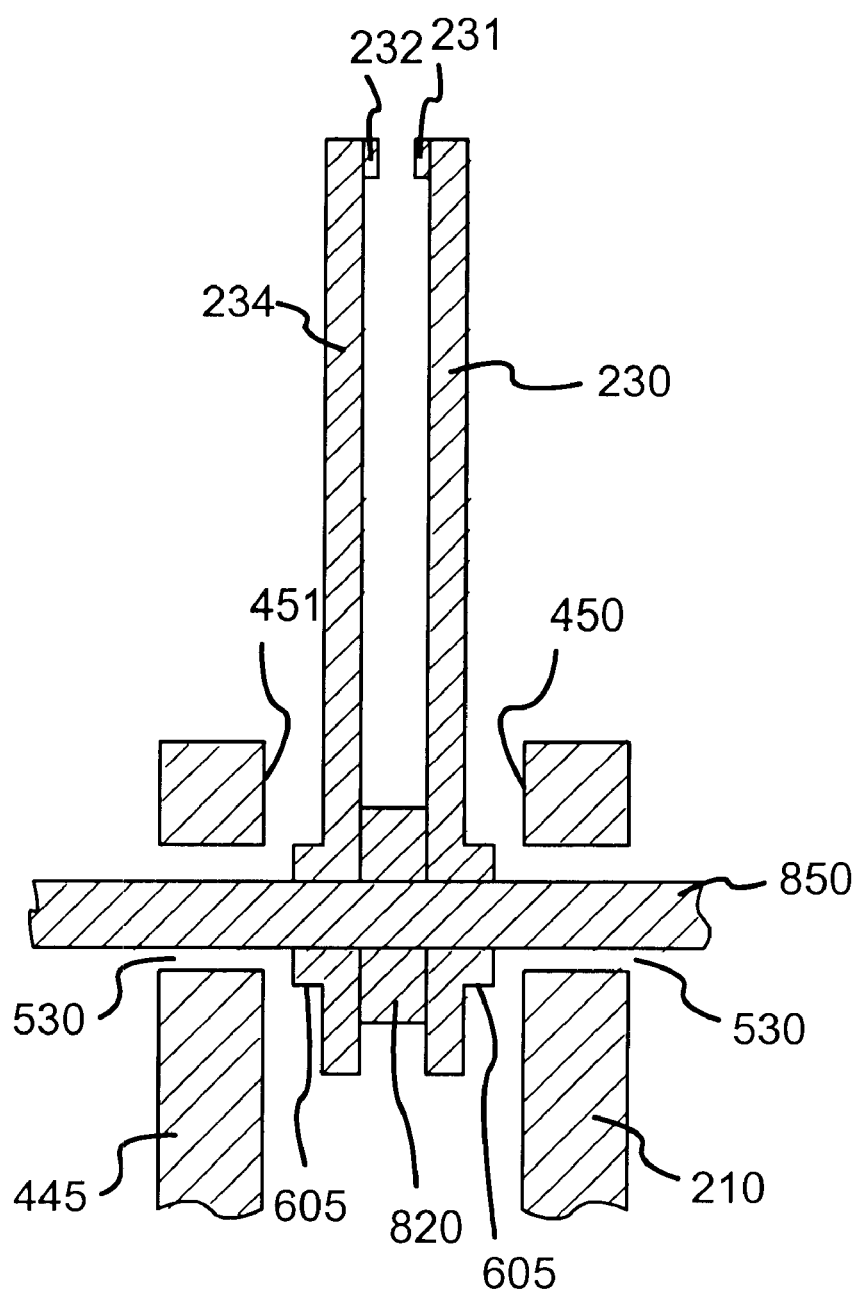
FIG. 19 is a cross-sectional view in isolation of a portion of two adjacent actuator arms and corresponding flex suspension assemblies as positioned on the apparatus shown in FIGS. 17 and 18.

An exploded view of an exemplary apparatus 800 for assembly of the E-block 100 in accordance with the present invention is shown in FIG. 16, and perspective views of the apparatus 800 with an actuator assemble attached are illustrated in FIGS. 17 and 18. Further, a close-up view of the actuator arms 210 and 445 during assembly of an E-block is shown in FIG. 19. Included in the various figures are a camming rod 810, a plurality of keys 820, a nest 830, supports 840 and 841, a boss 843, fasteners 845 and 846, a clasp pin 850, an alignment pin 860, a base plate 870, a boss pin 850, a key pin 880, and an actuator pin 890. The base plate 870 is coupled to the supports 840 and 841 via fasteners 846, and the nest 830 is coupled to the supports 840 and 841 via fasteners 845.

A method for assembling the E-block 100 includes first positioning the E-block body 201 (shown only in FIGS. 17 and 18) onto the supports 840 and 841 by inserting the boss 843 into the bearing bore 302 defined in the bottom of the E-block body 201. The actuator pin 890 is then inserted through the support 840 to engage and retain the E-block body 201 in position. A first flex suspension assembly, such as the flex suspension assembly 230, is positioned adjacent a bottom surface (such as 450) of a first actuator arm, such as actuator arm 210. The clasp pin 850 is advanced through the boss 605 of the first flex suspension assembly 230, holding the flex suspension assembly 230 in place.

A second flex suspension assembly, such as the flex suspension assembly 234, is then mounted onto an adjacent second actuator arm, such as the actuator arm 445, of the E-block body 201, such that a head (e.g. the head 231) on the first flex suspension assembly 230 faces a head (e.g. the head 232) on the second flex suspension assembly 234 in opposing fashion. The boss 605 on the first flex suspension assembly 230 is on an opposite side of the flex suspension assembly 230 with respect to the head 231, so that the boss 605 is adjacent to the first actuator arm 210, and the boss 605 on the second flex suspension assembly 234 is likewise on the opposite side of the flex suspension assembly 234 with respect to the head 232 on the second flex suspension assembly 234 so that the boss 605 is adjacent to the second actuator arm 445, as shown in FIG. 19. One of the plurality of keys 820 is then inserted between the first and second flex suspension assemblies 230 and 234, urging each boss 605 towards its respective clasp hole 530 defined in the respective actuator arms 210 and 445.

This process is repeated ten more times, until all flex suspension assemblies are mounted onto apparatus 800. Each time a flex suspension assembly is positioned, the clasp pin 850 is advanced. Once all of the flex suspension assemblies are in place, the alignment pin 860 is inserted through the nest 830 and through an alignment hole 861 defined by each flex suspension assembly. The key pin 880 is inserted to hold the plurality of keys 820 in place.

Assembly is completed by inserting the camming rod 810 through the aperture 847 defined in the support 841 and each respective clamp-opening hole 520 on each actuator arm. The camming rod 810, which is irregular in circumference, is then actuated, such as by turning, placing a displacement force on the clamp-opening hole 520 that is transferred to the clasp hole 530, thereby causing each clasp hole 530 on each actuator arm to be resiliently increased in diameter by forcing the clasp fingers 545 and 546 away from one another. This resilient deformation is facilitated by the slots 515 and 525 (and possibly 540) defined between the clamp-opening hole 520 and the clasp hole 530. As the clasp holes 530 are deformed so as to increase in diameter, the bosses 605 of each respective flex suspension assembly are urged into the clasp holes 530. The camming rod 810 is then rotated back to its initial position, thereby removing the force placed on the clamp-opening hole 520 and the clasp hole 530 and causing the clasp hole 530 to resiliently return to its initial diameter. When this occurs, the boss 605 of each flex suspension assembly, now complete disposed within its respective clasp hole 530, is engaged by each clasp hole 530 to hold the flex suspension assembly in place. Finally, the clasp pin 850, the alignment pin 860, and the plurality of keys 820 are removed to complete assembly of the E-block 100.

Figure 20:
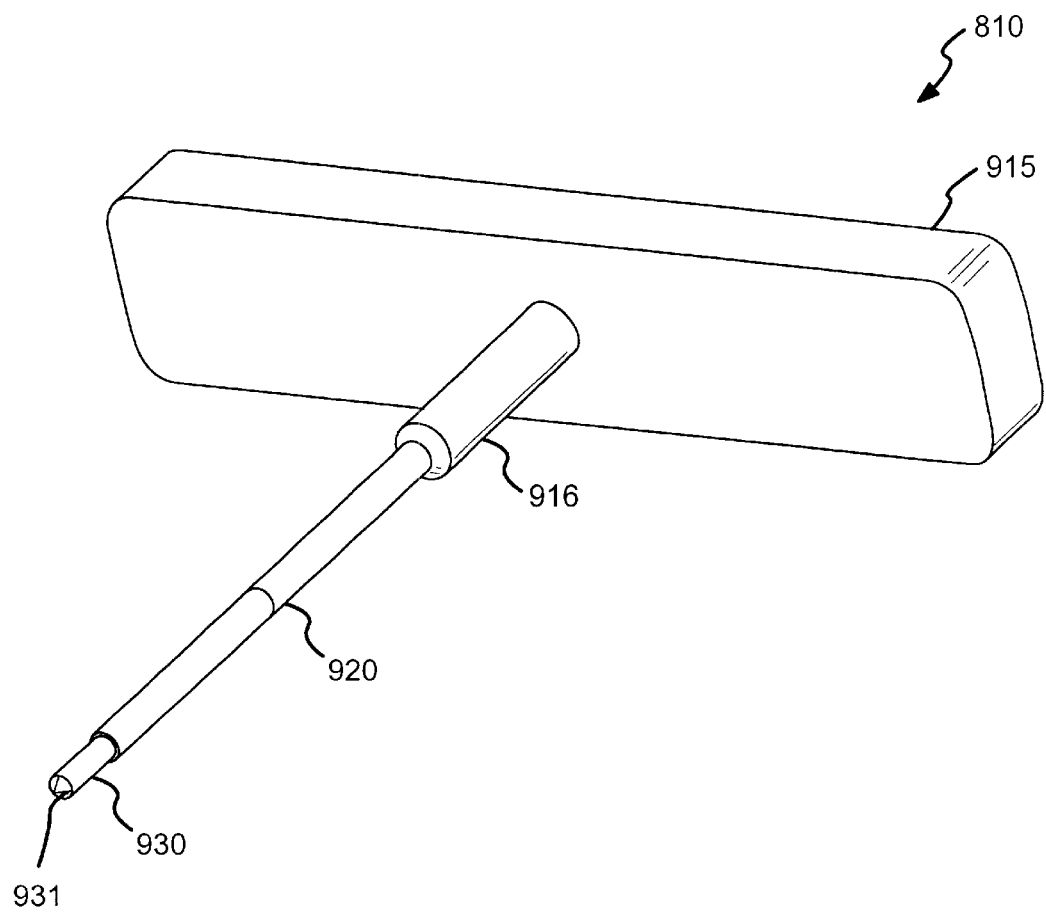
FIG. 20 is a perspective view of a camming rod that may be used in conjunction with the apparatus of FIGS. 16–18.
Figure 21:
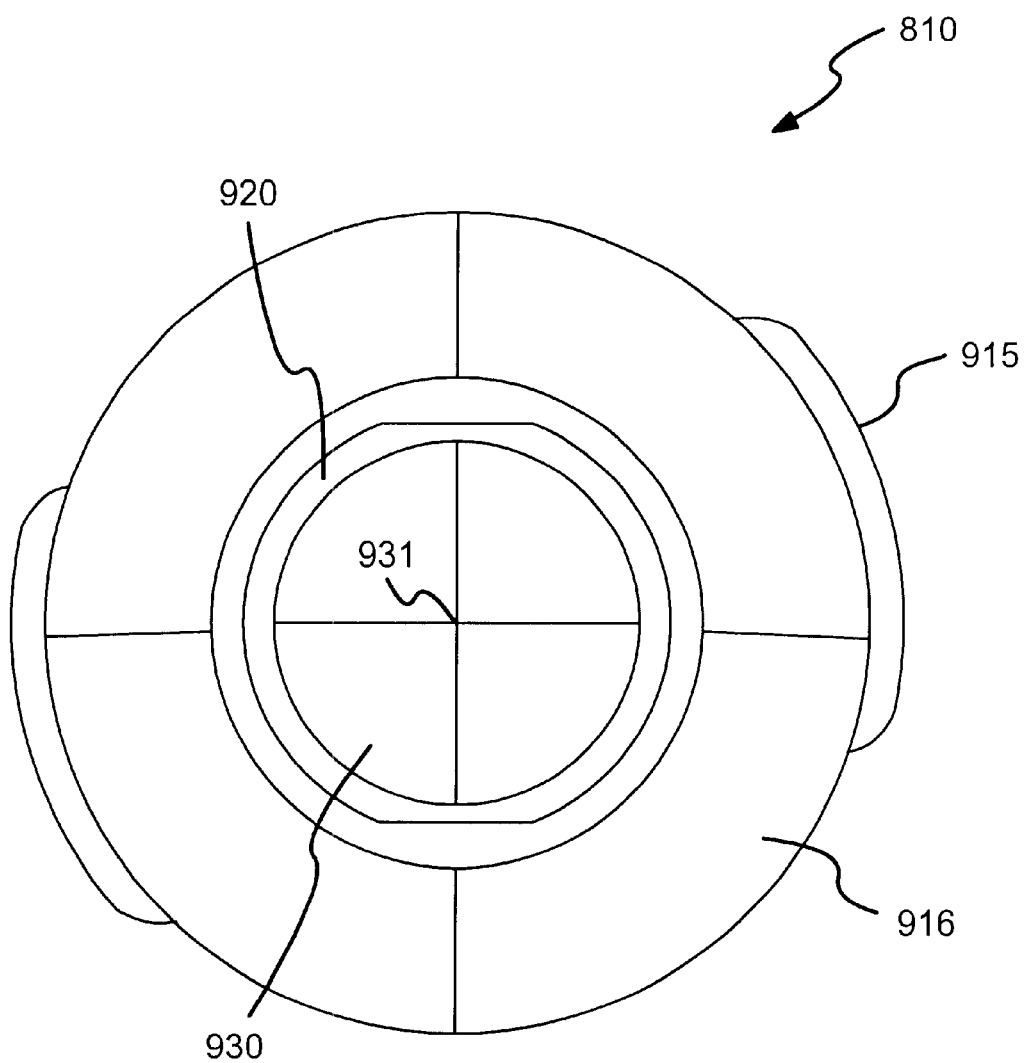
FIG. 21 is a close-up perspective end view of the camming rod shown in FIG. 20.

Detailed perspective and end views of the exemplary camming rod 810 are provided in FIGS. 20 and 21. The camming rod 810 comprises a handle 915, a first portion 916, a camming portion 920, and a third portion 930 with an end 931. The camming portion 920 is oval in shape to correspond generally with the shape of the clamp-opening hole 520 and sized to fit within the clamp-opening hole 520. Because of this irregular shape, when the camming rod 810 is inserted into and rotated within the plurality of clamp-opening holes 520, the camming portion 920 causes the clamp-opening holes 520 to be deformed. As described previously, this deformation is translated via the slots 525 to the clasp holes 530, forcing the clasp fingers 545 and 546 away from each other, thereby increasing the diameter D of the clasp holes 530. The camming portion, such as 920, may be sized to actuate a single actuator arm, thereby facilitating the increase in the diameter of a single clasp hole. Alternatively, the camming portion may be sized larger, facilitating the increase in the diameter of multiple clasp holes defined by two or more adjacent actuator arms.

Figure 22:
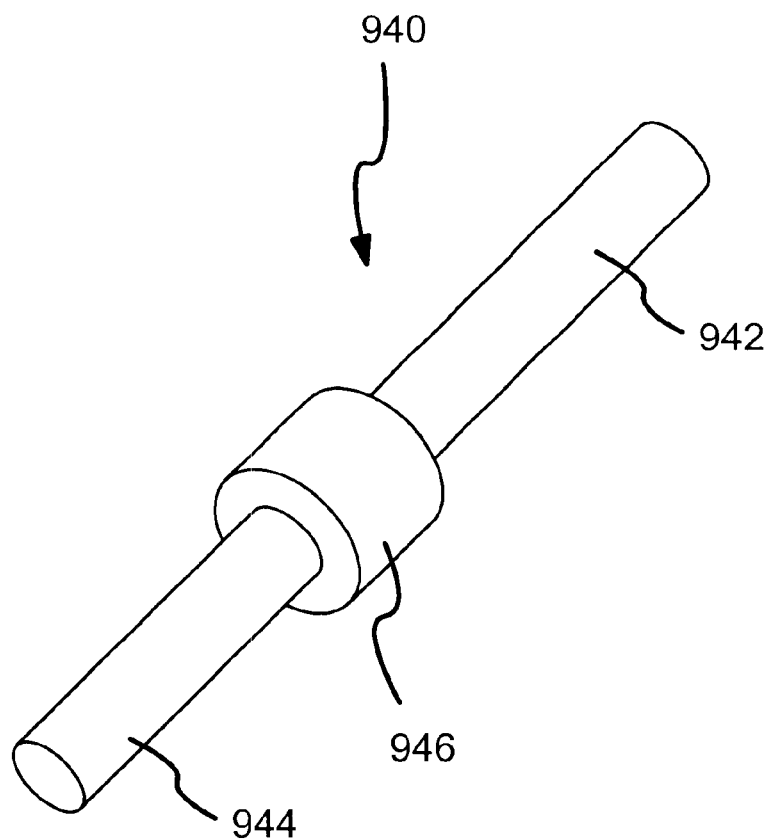
FIG. 22 is a perspective view of another camming rod that may be used in conjunction with the apparatus of FIGS. 16–18.
Figure 23:
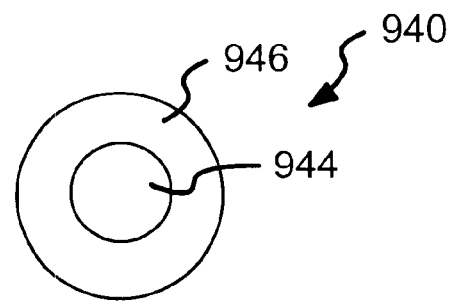
FIG. 23 is an end view of the camming rod shown in FIG. 22.

Other embodiments for the camming rod are also possible. For example, a camming rod may be formed so that only a small segment of the camming rod includes a camming portion 920. In this configuration, shown as camming rod 940 in FIGS. 22 and 23, first and second portions 942 and 944 are smaller in circumference than middle cam portion 946, which is sized to be larger in circumference than a clamp-opening hole on a flex suspension assembly. In this manner, fewer than all of the actuator arms may be deformed at one time.

Figure 24:
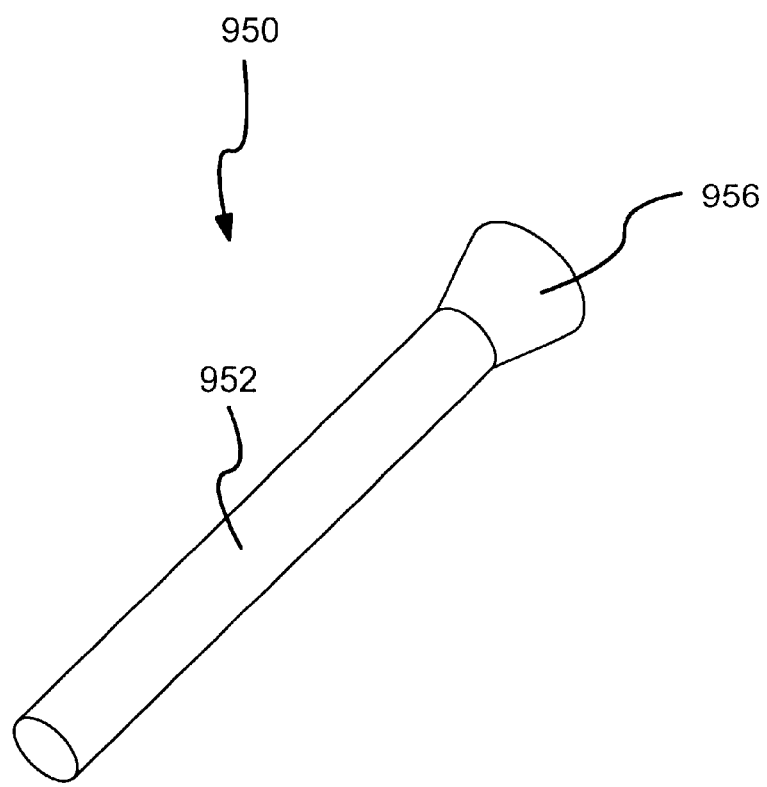
FIG. 24 is a perspective view of another camming rod that may be used in conjunction with the apparatus of FIGS. 16–18.
Figure 25:
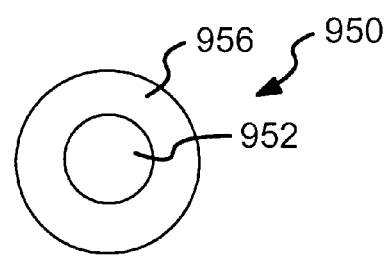
FIG. 25 is an end view of the camming rod shown in FIG. 24.

In another embodiment illustrated in FIGS. 24 and 25, an exemplary camming rod 950 comprises a camming body 952 sized to fit within the clamp-opening holes and a tapered conical tip 956 sized to increase in diameter to a size larger than the clamp-opening holes. With this embodiment, the camming body 952 is inserted through the clamp-opening holes, dragging the conical tip 956 through each clamp-opening hole and thereby deforming each clasp hole as the conical tip 956 passed through each clamp-opening hole.

Figure 26:
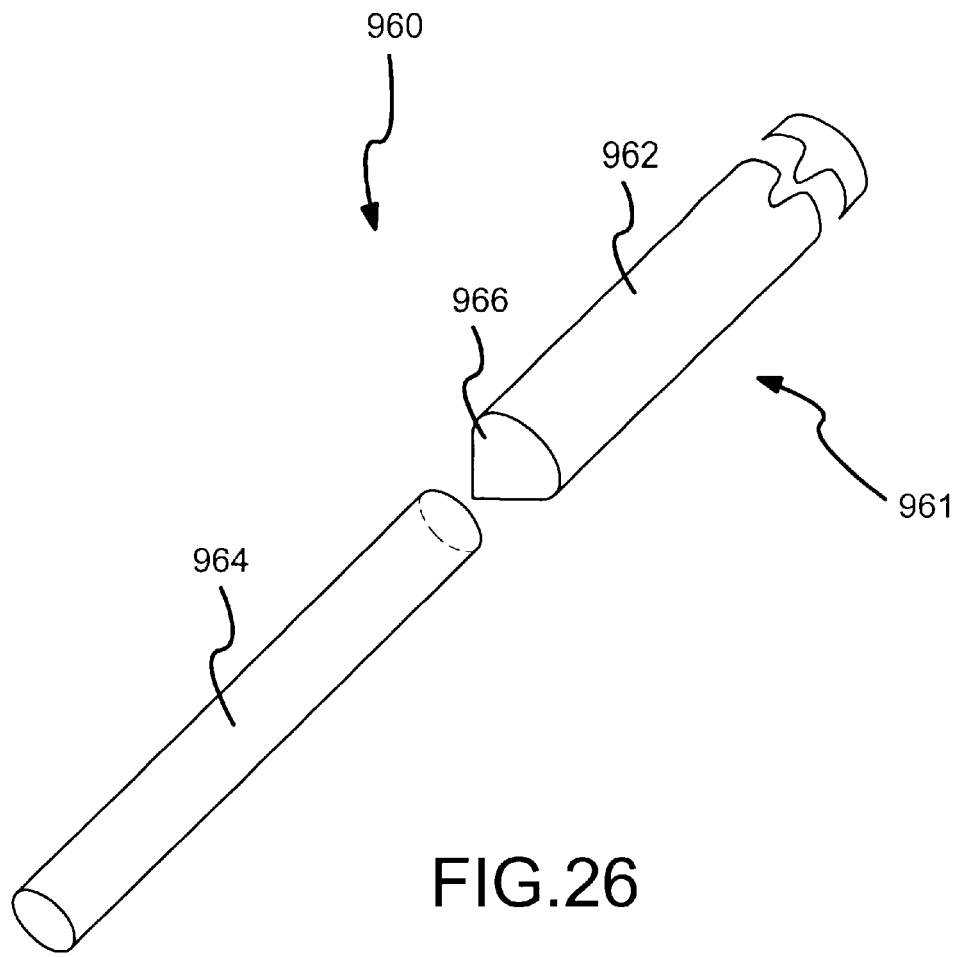
FIG. 26 is an end view of a collet assembly that may be used in conjunction with the apparatus of FIGS. 16–18.
Figure 27:
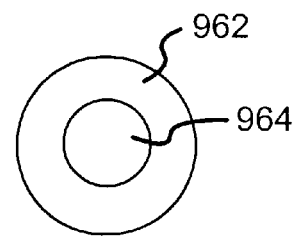
FIG. 27 is an end view of the collet assembly shown in FIG. 26, with the pin adjacent to but not inserted into the sleeve of the collet assembly.

In addition, an apparatus other than a camming rod may also be used. In an exemplary embodiment shown in FIGS. 26 and 27, a collet assembly 960 comprises an outer sleeve 964 sized to fit within a clamp-opening hole and a pin 961 sized larger in diameter than the clamp-opening hole, the pin 961 including a body 962 and a tapered tip 966. The outer sleeve 964 is inserted through the clamp-opening holes and then the pin 961 is inserted into the outer sleeve 964, causing the outer sleeve 964 and therefore the clamp-opening holes to increase in diameter and thereby allowing the bosses on the flex suspension assemblies to enter the clasp holes.

The actuator arms of the actuator assembly may be made from a variety of materials. In an exemplary embodiment of the invention, the actuator arms are made of titanium, which provides the clamping force necessary to retain the flex suspension assemblies within the clasp holes while still being flexible enough to allow for the deformation of the clamp-opening hole and the clasp hole to facilitate the coupling of the flex suspension assemblies to the actuator arms. Use of titanium may further be advantageous in that it is nonferrous and therefore does not create a magnetic field that may interfere with reading and writing from and to a magnetic disc. Other materials may also be used, such as stainless steel, without departing from the scope of the invention.

An actuator assembly made in accordance with the present invention may exhibit one or more advantages. First, use of the clamp-opening hole, clasp hole, and boss presented on the flex suspension assembly causes little or no damage to the actuator arms during coupling and removal of the flex suspension assemblies. This is a significant improvement over the prior art swaging technique, which only allowed for limited reuse of each actuator arm before the actuator arm needed to be replaced.

Second, the reduction in stress on the actuator arms during assembly and removal of the flex suspension assemblies improves the overall flying characteristics of the actuator arms, especially in the closed-end embodiments including the clamp. In these embodiments, the flatness of the actuator arm is maintained by keeping the clasp fingers in the same plane, thereby reducing vibrations and other disruptive events such as pitches and rolls that may occur when the actuator arm is caused to fly above the magnetic disc. Data collected from tests performed on one or more of the embodiments of the actuator arms disclosed herein showed an improvement in the resonance or vibrational characteristics of the actuator arms while in use.

Third, the consistency of the clamping force is improved, especially in the closed-end variety. In these embodiments, the clamping force created by the clasp hole closing around the boss of the flex suspension assembly is maintained, thereby consistently holding the flex suspension assemblies in place. Data collected from tests performed on one or more of the embodiments of the actuator arms disclosed herein showed sufficient and consistent clamping force necessary to hold the flex suspension assemblies in place.

In summary, an embodiment of the invention may be viewed as an actuator assembly (for example 100) for reading and writing data from and to a magnetic disc (for example 155). The actuator assembly (for example 198) may comprise an actuator arm (for example 205) including a proximal end and a distal end, wherein the actuator arm (for example 205) defines a clamp-opening hole (for example 520, 554, or 574) and a clasp hole (for example 530, 553, or 573) and a first slot (for example 525, 557, or 577) running from the clamp-opening hole (for example 520, 554, or 574) to the clasp hole (for example 530, 553, or 573). The actuator assembly (for example 198) may further comprise a flex suspension assembly (for example 206), wherein the flex suspension assembly (for example 206) includes a protrusion (for example 605) having an outer width greater than an inner width of the clasp hole (for example 530, 553, or 573). The flex suspension assembly (for example 206) may be coupled to the actuator arm (for example 205) via the protrusion (for example 605) being inserted into the clasp hole (for example 530, 553, or 573) in the actuator arm (for example 205).

In another embodiment according to the invention, an apparatus for assembling an E-block (for example 800) includes an actuator arm (for example 205) having a proximal and a distal end, wherein the actuator arm defines a clamp-opening hole (for example 520, 554, or 574) and a clasp hole (for example 530, 553, or 573) between the proximal end and the distal end and the actuator arm (for example 205) defines a first slot (for example 525, 557, or 577) running from the clamp-opening hole to the clasp hole. The apparatus (for example 800) further includes a flex suspension assembly (for example 206) and a cam (for example 810, 940, 950, or 960) inserted through the clamp-opening hole (for example 520, 554, or 574) in the actuator arm (for example 205) resiliently widening the clasp hole (for example 530, 553, or 573), permitting a protrusion (for example 605) of the flex suspension assembly (for example 206) to be received within the clasp hole (for example 530, 553, or 573).

In another embodiment according to the invention, a method of coupling a plurality of actuator arms (for example 205) of an actuator assembly (for example 198) to a plurality of flex suspension assemblies (for example 206) may comprise the steps of: positioning a first flex suspension assembly (for example 230) from the plurality of flex suspension assemblies (for example 206) near a first actuator arm (for example 210) from the plurality of actuator arms (for example 205) so that a first boss (for example 605) on the first flex suspension assembly (for example 230) is disposed adjacent to a first clasp hole (for example 530, 553, or 573)

defined by the first actuator arm (for example 210); positioning a second flex suspension assembly (for example 234) from the plurality of flex suspension assemblies (for example 206) near a second actuator arm (for example 445) so that a second boss (for example 605) on the second flex suspension assembly (for example 234) is disposed adjacent to a second clasp hole (for example 530) defined by the second actuator arm for example 445), such that a first head (for example 231) on the first flex suspension assembly (for example 230) is facing a second head (for example 232) on the second flex suspension assembly (for example 234); inserting a first key from a plurality of keys (for example 820) between the first flex suspension assembly (for example 230) and the second flex suspension assembly (for example 234) so as to bias the first boss (for example 605) towards the first clasp hole (for example 530, 553, or 573) and the second boss (for example 605) towards the second clasp hole (for example 530, 553, or 573); widening the first clasp hole (for example 530, 553, or 573) and the second clasp hole (for example 530, 553, or 573) by deforming a first clamp-opening hole (for example 520, 554, or 574) defined by the first actuator arm (for example 210) and a second clamp-opening hole (for example 520, 554, or 574) defined by the second actuator arm (for example 445); and removing the first key (for example 820).

In another exemplary embodiment according to the invention, an actuator assembly (for example 198) for reading and writing from and to a plurality of magnetic discs (for example 155) may comprise a plurality of actuator arms (for example 205) coupled at a proximal end to the actuator body (for example 201) and a means for coupling the plurality of actuator arms (for example 205) at a distal end to a plurality of flex suspension assemblies (for example 206).

It will be clear that the present invention is well adapted to attain the ends and advantages mentioned as well as those inherent therein. While an exemplary embodiment has been described for purposes of this disclosure, various changes and modifications may be made which are well within the scope of the present invention. For example, methods other than a boss may be used to attach the actuator arm to the flex suspension assembly. For instance, the actuator arm may be formed so as to encompass a portion of the flex suspension assembly itself, rather than include a boss disposed on the flex suspension assembly. Numerous other changes may be made which will readily suggest themselves to those skilled in the art and which are encompassed in the spirit of the invention disclosed and as defined in the appended claims.

What is claimed is:

1. A method of coupling a plurality of actuator arms of an actuator assembly to a plurality of flex suspension assemblies, the method comprising steps of:
   (a) positioning a first flex suspension assembly from the plurality of flex suspension assemblies near a first actuator arm from the plurality of actuator arms so that a first protrusion on the first flex suspension assembly is disposed adjacent to a first clasp hole defined by the first actuator arm;
   (b) positioning a second flex suspension assembly from the plurality of flex suspension assemblies near a second actuator arm so that a second protrusion on the second flex suspension assembly is disposed adjacent to a second clasp hole defined by the second actuator arm, such that a first head on the first flex suspension assembly is facing a second head on the second flex suspension assembly;
   (c) inserting a first key from a plurality of keys between the first flex suspension assembly and the second flex suspension assembly so as to bias the first protrusion towards the first clasp hole and the second protrusion towards the second clasp hole;
   (d) widening the first clasp hole and the second clasp hole by deforming a first clamp-opening hole defined by the first actuator arm and a second clamp-opening hole defined by the second actuator arm; and
   (e) removing the first key.

2. The method of claim 1, further comprising steps of:
   (f) advancing a clasp pin through the first protrusion; and
   (g) advancing the clasp pin through the second protrusion.

3. The method of claim 2, further comprising a step (h) of repeating the positioning, inserting, and advancing steps for each of the plurality of actuator arms and each of the plurality of flex suspension assemblies.

4. The method of claim 1, further comprising a step (f) of inserting an alignment pin through a nest and through an alignment hole defined by each of the plurality of flex suspension assemblies.

5. The method of claim 1, wherein the widening step (d) comprises steps of:
   (d)(i) inserting a cam through the first clamp-opening hole and the second clamp-opening hole; and
   (d)(ii) rotating the cam.

6. The method of claim 1, wherein the widening step (d) comprises steps of:
   (d)(i) inserting a collet sleeve through the first clamp-opening hole and the second clamp-opening hole; and
   (d)(ii) inserting a pin sized larger in diameter than a diameter of the collet sleeve and diameters of the first clamp-opening hole and the second clamp-opening hole into the collet sleeve.

7. The method of claim 1, further comprising steps of:
   (f) inserting a cam through the first clamp-opening hole;
   (g) widening the first clasp hole; and
   (h) removing the first protrusion from within the first clasp hole of the first actuator arm.

8. Apparatus for coupling a plurality of actuator arms of an actuator assembly to a plurality of flex suspension assemblies, the apparatus comprising:
   means for positioning a first flex suspension assembly from the plurality of flex suspension assemblies near a first actuator arm from the plurality of actuator arms so that a first protrusion on the first flex suspension assembly is disposed adjacent to a first clasp hole defined by the first actuator arm;
   means for positioning a second flex suspension assembly from the plurality of flex suspension assemblies near a second actuator arm so that a second protrusion on the second flex suspension assembly is disposed adjacent to a second clasp hole defined by the second actuator arm, such that a first head on the first flex suspension assembly is facing a second head on the second flex suspension assembly;
   means for inserting a first key from a plurality of keys between the first flex suspension assembly and the second flex suspension assembly so as to bias the first protrusion towards the first clasp hole and the second protrusion towards the second clasp hole;
   means for widening the first clasp hole and the second clasp hole by deforming a first clamp-opening hole defined by the first actuator arm and a second clamp-opening hole defined by the second actuator arm; and
   means for removing the first key.

9. The apparatus of claim 8, further comprising:

means for advancing a clasp pin through the first protrusion; and means for advancing the clasp pin through the second protrusion.

10. The apparatus of claim 9 wherein each of said means for positioning, inserting, and advancing operate on each of the plurality of actuator arms and each of the plurality of flex suspension assemblies.

11. The apparatus of claim 8, further comprising:

means for inserting an alignment pin through a nest and through an alignment hole defined by each of the plurality of flex suspension assemblies.

12. The apparatus of claim 1, wherein the means for widening step comprises:

means for inserting a cam through the first clamp-opening hole and the second clamp-opening hole; and means for rotating the cam.

13. The apparatus of claim 1, wherein the means for widening step comprises:

means for inserting a collet sleeve through the first clamp-opening hole and the second clamp-opening hole; and means for inserting a pin sized larger in diameter than a diameter of the collet sleeve and diameters of the first clamp-opening hole and the second clamp-opening hole into the collet sleeve.

14. The apparatus of claim 1 further comprising:

means for inserting a cam through the first clamp-opening hole;

means for widening the first clasp hole; and means for removing the first protrusion from within the first clasp hole of the first actuator arm.

* * * * *